(12) United States Patent
Kuo et al.

(10) Patent No.: US 12,368,957 B2
(45) Date of Patent: Jul. 22, 2025

(54) CAMERA MODULE AND ELECTRONIC DEVICE

(71) Applicant: HUAWEI TECHNOLOGIES CO., LTD., Shenzhen (CN)

(72) Inventors: Li-Te Kuo, Dongguan (CN); Kuni Lee, Shenzhen (CN); Hongbo Luo, Dongguan (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 203 days.

(21) Appl. No.: 18/069,763

(22) Filed: Dec. 21, 2022

(65) Prior Publication Data

US 2023/0126781 A1 Apr. 27, 2023

Related U.S. Application Data

(63) Continuation of application No. PCT/CN2021/096935, filed on May 28, 2021.

(30) Foreign Application Priority Data

Jun. 24, 2020 (CN) .......................... 202010590282.0

(51) Int. Cl.
*H04N 23/68* (2023.01)
*H04N 23/54* (2023.01)
(Continued)

(52) U.S. Cl.
CPC ........... *H04N 23/687* (2023.01); *H04N 23/54* (2023.01); *H04N 23/55* (2023.01); *H04N 23/57* (2023.01)

(58) Field of Classification Search
CPC ...... H04N 23/687; H04N 23/54; H04N 23/55; H04N 23/57; H04N 23/50; H04N 23/58;
(Continued)

(56) References Cited

U.S. PATENT DOCUMENTS

2016/0274375 A1* 9/2016 Park ..................... G03B 3/10
2018/0173080 A1* 6/2018 Enta ..................... H04N 23/57
(Continued)

FOREIGN PATENT DOCUMENTS

CN 205982857 U 2/2017
CN 208924333 U 5/2019
(Continued)

*Primary Examiner* — Timothy J Henn
(74) *Attorney, Agent, or Firm* — Leydig, Voit & Mayer, Ltd.

(57) ABSTRACT

A camera module and an electronic device are provided. The camera module includes a lens assembly and an image stabilization assembly. The lens assembly includes a rigid flexible printed circuit board and a lens. The rigid flexible printed circuit board includes a rigid board part and a flexible board part led out from the rigid board part. The image stabilization assembly includes a movable part, a fastening part, and a connecting component. The movable part is fastened to the lens assembly, the fastening part is connected to the movable part by using the connecting component, and the movable part is configured to rotate relative to the fastening part by using the connecting component. A coordinate of a rotation center of the movable part in a Z-axis direction is close to or equal to a coordinate of the rigid board part in an optical axis of the lens.

20 Claims, 11 Drawing Sheets

(51) Int. Cl.
*H04N 23/55* (2023.01)
*H04N 23/57* (2023.01)

(58) Field of Classification Search
CPC ............ G03B 30/00; G03B 2205/0023; G03B 2205/0069; G03B 5/00; G03B 5/04; G03B 17/12
See application file for complete search history.

(56) References Cited

U.S. PATENT DOCUMENTS

| | | | |
|---|---|---|---|
| 2018/0348469 A1* | 12/2018 | Son | G02B 7/09 |
| 2020/0196447 A1* | 6/2020 | Mak | H05K 1/118 |
| 2020/0260011 A1* | 8/2020 | Sasaki | G03B 5/00 |
| 2021/0321024 A1* | 10/2021 | Song | H04N 23/687 |
| 2022/0137486 A1 | 5/2022 | Oh | |
| 2023/0353858 A1* | 11/2023 | Oh | H04N 23/58 |

FOREIGN PATENT DOCUMENTS

| | | |
|---|---|---|
| CN | 210142249 U | 3/2020 |
| CN | 111142323 A | 5/2020 |
| CN | 111654612 A | 9/2020 |
| JP | 2011257506 A | 12/2011 |
| JP | 2011257556 A | 12/2011 |
| JP | 2015114484 A | 6/2015 |
| JP | 2017090809 A | 5/2017 |
| JP | 2019053271 A | 4/2019 |
| JP | 2023512504 A | 3/2023 |
| WO | 2010044198 A1 | 4/2010 |
| WO | 2019037159 A1 | 2/2019 |

* cited by examiner

CAMERA MODULE AND ELECTRONIC DEVICE

CROSS-REFERENCE TO RELATED APPLICATIONS

This application is a continuation of International Application No. PCT/CN2021/096935, filed on May 28, 2021, which claims priority to Chinese Patent Application No. 202010590282.0, filed on Jun. 24, 2020. The disclosures of the aforementioned applications are hereby incorporated by reference in their entireties.

TECHNICAL FIELD

Embodiments of this application relate to the field of camera technologies, and in particular, to a camera module and an electronic device.

BACKGROUND

As a user has an increasingly high shooting requirement on an electronic device, a requirement on image stabilization performance of a camera module is also stricter. Currently, the camera module includes a lens assembly and an image stabilization pan-tilt-zoom. The lens assembly is installed on the image stabilization pan-tilt-zoom, and the image stabilization pan-tilt-zoom drives the lens assembly to rotate, to compensate for shake of the camera module, thereby implementing optical image stabilization.

However, one end of a circuit board based on the lens assembly is fastened to another component inside the electronic device. Therefore, in a process in which the image stabilization pan-tilt-zoom drives the lens assembly to rotate, the circuit board deforms and tilts, and a reactive force formed by the circuit board interferes with a rotation action of the lens assembly, thereby affecting image stabilization performance of the image stabilization pan-tilt-zoom.

SUMMARY

This application provides a camera module and an electronic device. In an image stabilization process of the camera module, a reactive force generated by a rigid flexible printed circuit board is small, thereby facilitating improvement of image stabilization performance of the camera module.

According to a first aspect, this application provides a camera module. The camera module includes a lens assembly and an image stabilization assembly. The image stabilization assembly is configured to drive the lens assembly to rotate, to compensate for shake of the camera module in a shooting process of the electronic device, thereby implementing image stabilization.

The lens assembly includes a rigid flexible printed circuit board (RFPCB) and a lens. The rigid flexible printed circuit board is a circuit board having characteristics of both a rigid printed circuit board (PCB) and a flexible printed circuit board (FPC). A person skilled in the art can design the rigid flexible printed circuit board based on an actual requirement. A specific structure, a forming process, and the like of the rigid flexible printed circuit board are not limited in this application. For example, the rigid flexible printed circuit board includes a rigid board part and a flexible board part led out from the rigid board part. The flexible board part is led out from the rigid board part to an outer side of the image stabilization assembly, and is configured to electrically connect to another component in the electronic device, for example, an image processor, to transfer a signal of the lens assembly to the image processor.

In this embodiment of this application, because the flexible board part may be bent and deformed, the flexible board part may be fastened at a required position through bending and deformation, thereby facilitating arrangement of other components in the electronic device.

The lens assembly further includes an image sensor. The image sensor is fastened to the rigid board part, and is electrically connected to the rigid board part. After passing through the lens, external light falls into a photosensitive surface of the image sensor, and is imaged on the image sensor. The image sensor is electrically connected to the rigid flexible printed circuit board, so that an electrical signal formed by the image sensor is transmitted to another component by using the rigid flexible printed circuit board.

In this embodiment of this application, in a process in which the image stabilization assembly drives the lens assembly to rotate, the lens and the image sensor rotate together, that is, positions of the lens and the image sensor remain unchanged, and a position of an image projected by the lens on the image sensor is fixed, so that a small photosensitive surface provided on the image sensor can meet an imaging requirement, thereby reducing a volume of the image sensor.

In an optional embodiment, the lens assembly further includes a focusing assembly, and the focusing assembly is configured to implement automatic focusing of the camera module. For example, the lens includes a base, and the base is fastened to the rigid board part. The base is a hollow structure with openings at two ends. The base is an outermost structure of the lens assembly. The movable part is fastened around the base.

The lens further includes a lens group and a lens tube. The focusing assembly is fastened to an inner side of the base, the lens assembly is installed to an inner side of the lens tube, and the lens tube and the lens assembly are installed to an inner side of the focusing assembly. The focusing assembly is configured to drive the lens tube and the lens assembly to move along an optical axis direction of the lens assembly, to change an image distance to obtain a clear image and implement automatic focusing of the camera module.

In this embodiment of this application, the camera module drives, by using the focusing assembly, the lens tube and the lens group to move, to implement focusing, and drives, by using the image stabilization assembly, the lens to rotate, to implement image stabilization. In other words, a focusing function and an image stabilization function in the camera module are driven by different structures. This helps implement large-angle image stabilization of the camera module.

A person skilled in the art can design the focusing assembly based on an actual requirement. A specific driving manner, a structure, and the like of the focusing assembly are not limited in this application. In some other embodiments, the lens assembly may alternatively not be provided with the focusing assembly. This is not limited in this application.

In an optional embodiment, the image stabilization assembly includes a movable part, a fastening part, and a connecting component. The movable part is fastened to the lens assembly, the fastening part is connected to the movable part by using the connecting component, and the movable part is configured to rotate relative to the fastening part by using the connecting component.

For example, the movable part is fastened around the lens assembly, and the fastening part is enclosed around the movable part, and is spaced from the movable part. The connecting component connects the fastening part and the movable part. It may be understood that the fastening part is of a hollow structure, and the movable part is located on an inner side of the fastening part. The movable part is suspended relative to the fastening part, and the connecting component supports the movable part.

In this embodiment of this application, when the image stabilization assembly responds to the electrical signal, the movable part rotates relative to the fastening part. Because the movable part is fastened to the lens assembly, when the movable part rotates relative to the fastening part, the movable part can drive the lens assembly to rotate together relative to the fastening part. That is, the image stabilization assembly is configured to respond to the electrical signal, and drive the lens assembly to rotate relative to the fastening part, to compensate for shake of the camera module, thereby implementing image stabilization. The fastening part and the movable part are spaced, to avoid that rotation of the movable part is affected by interference between the fastening part and the movable part when the movable part rotates relative to the fastening part, thereby ensuring reliability of the image stabilization assembly.

It may be understood that the movable part rotates relative to the fastening part by using the connecting component, and the connecting component is connected to positions of the movable part and the fastening part, so that a rotation center of the movable part relative to the fastening part is determined. The movable part is fastened relative to the lens assembly, and the rotation center of the movable part is the same as a rotation center of the lens assembly. A larger spacing between the rotation center of the lens assembly and the rigid board part in the lens assembly indicates, if a rotation angle of the lens assembly meets a requirement, a larger offset of the rigid board part, and further indicates a larger deformation generated by the flexible board part led out from the rigid board part.

In an optional embodiment, a coordinate of the rotation center of the movable part in a Z-axis direction is close to or equal to a coordinate of the rigid board part in the Z-axis direction, and the Z-axis direction is a direction of an optical axis of the lens. The rotation center of the movable part relative to the fastening part is determined based on a center of the connecting component, that is, the center of the connecting component is located at R.

In this embodiment of this application, a spacing between the rotation center of the movable part and the rigid board part is less than half of a thickness of the base, that is, the rotation center of the movable part deviates from a middle part of the base and is close to the rigid board part. This reduces the spacing between the rotation center of the movable part and the rigid board part, reduces an offset of an edge of the rigid board part if a rotation angle of the lens assembly meets a requirement, and therefore reduces a deformation of the flexible board part led out from the edge of the rigid board part, so that a reactive force generated by the flexible board part is small, thereby facilitating image stabilization of the image stabilization assembly.

In an optional embodiment, a distance between the rotation center of the movable part and the rigid board part in the Z-axis direction is a first distance, and the first distance is less than half of a shoulder height of the lens. The shoulder height of the lens is a thickness of the base in the Z-axis direction. It may be understood that a side that is of the rigid board part and that faces the base is used as a reference plane, a side that is of the base and that is away from the rigid board part is a "shoulder" part of the lens, and the shoulder height of the lens is defined as the thickness of the base in the Z-axis direction.

In this embodiment of this application, a spacing between the rotation center of the movable part and the rigid board part is less than half of a thickness of the base, that is, the rotation center of the movable part deviates from a middle part of the base and is close to the rigid board part. This reduces the spacing between the rotation center of the movable part and the rigid board part, reduces an offset of an edge of the rigid board part if a rotation angle of the lens assembly meets a requirement, and therefore reduces a deformation of the flexible board part led out from the edge of the rigid board part, so that a reactive force generated by the flexible board part is small, thereby facilitating image stabilization of the image stabilization assembly.

In an optional embodiment, the connecting component includes a movable base and an elastic connecting piece, the movable base is fastened to a side that is of the rigid board part and that is away from the lens, one end of the elastic connecting piece is connected to the movable base, and the other end is connected to the fastening part.

The movable part is connected to the fastening part by using the elastic connecting piece, and the elastic connecting piece supports the movable part, so that a connection position between the elastic connecting piece and the movable base determines the rotation center of the movable part. The movable base is directly connected to the rigid board part, to reduce a distance between the rigid board part and a side that is of the movable base and that is away from the rigid board part.

For example, one end of the elastic connecting piece is fastened to the side that is of the movable base and that is away from the rigid board part, so that the rotation center of the movable part is located on the movable base, and therefore the rotation center of the movable part is close to the rigid board part. In another embodiment, one end of the elastic connecting piece can also be fastened to a side edge of the movable base, so that the rotation center of the movable part is close to or equal to the rigid board part. This is not limited in this application.

In this embodiment of this application, one end of the elastic connecting piece is connected to the movable base, and the other end is connected to the fastening part, so that the rotation center of the movable part is located on the movable base. In addition, the movable base is fastened to the side that is of the rigid board part and that is away from the lens, so that the rotation center of the movable part is close to the rigid board part, thereby reducing the spacing between the rotation center of the movable part and the rigid board part.

In an optional embodiment, the elastic connecting piece includes a plurality of spring plates, and two ends of each spring plate are respectively connected to the movable base and the fastening part. The plurality of spring plates are symmetrically arranged in an X-axis direction, and symmetrically arranged in a Y-axis direction. Both the X-axis direction and the Y-axis direction are perpendicular to the Z-axis direction, the X-axis direction and the Y-axis direction are perpendicular and intersect, and an intersection point of an X axis and a Y axis is the rotation center of the movable part.

In this embodiment of this application, the elastic connecting piece includes the plurality of spring plates symmetrically arranged in the X-axis direction and symmetrically arranged in the Y-axis direction, so that the image stabilization assembly drives the lens assembly to tiltedly rotate in a balanced and stable manner relative to the fastening part in the X-axis direction and the Y-axis direction, to effectively compensate for offsets of the camera module in the X-axis direction and the Y-axis direction.

In an optional embodiment, the flexible board part extends from the rigid board part along the X-axis direction or the Y-axis direction to the outer side of the image stabilization assembly.

In this embodiment of this application, an extension direction of the flexible board part is the same as a rotation axis (the X-axis direction or the Y-axis direction) of rotation of the lens assembly relative to the fastening part, and the flexible board part may be folded and bent, so that when the lens assembly rotates, a displacement of the flexible board part relative to the fastening part is small, and a reactive force generated by the flexible board part is small, thereby facilitating image stabilization of the camera module.

In an optional embodiment, the movable base includes a first base and a second base, and the second base is fastened to a side that is of the first base and that is away from the lens assembly. One end of the elastic connecting piece is fastened to the second base, and a gap is formed between the elastic connecting piece and the first base.

For example, the second base protrudes along a side that is of the first base and that is facing away from the lens assembly, so that a gap is formed between the elastic connecting piece fastened to the second base and the first base. The first base is connected to the movable part, so that the movable base is directly connected to the movable part.

In this embodiment of this application, the movable base includes the first base and the second base fastened to the side that is of the first base and that is away from the lens assembly. The elastic connecting piece is fastened to the second base, and forms the gap with the first base. The gap provides avoidance space when the lens assembly rotates relative to the fastening part, to prevent the elastic connecting piece from interfering with rotation of the lens assembly, thereby facilitating large-angle image stabilization of the camera module.

In an optional embodiment, the fastening part further includes a fastening baffle, the fastening baffle is located on a side that is of the elastic connecting piece and that is away from the movable base, and a projection of the fastening baffle on the movable base covers at least a part of a projection of the elastic connecting piece on the movable base.

In this embodiment of this application, the fastening baffle is located on the side that is of the elastic connecting piece and that is away from the movable base, and the projection of the fastening baffle on the base covers at least the part of the projection of the elastic connecting piece on the movable base, to protect the elastic connecting piece and prevent the elastic connecting piece from being deformed due to an external force, thereby improving quality of the camera module. For example, when the camera module is assembled to the electronic device, the fastening baffle can protect the elastic connecting piece, to avoid damage to the elastic connecting piece in an assembly process.

In an optional embodiment, a gap is formed between the fastening baffle plate and the elastic connecting piece.

In this embodiment of this application, the gap is formed between the fastening baffle plate and the elastic connecting piece. The gap provides avoidance space when the movable part rotates relative to the fastening part to drive the movable base to rotate relative to the fastening part, to prevent the fastening baffle plate from interfering with the movable part or the movable base, thereby improving reliability of the camera module.

In an optional embodiment, the movable part further comprises an inner frame and a first driving piece, the inner frame is located around the lens assembly, and the first driving piece is fastened around the inner frame. The first driving piece is fastened by using the inner frame, and the inner frame is fastened around the lens assembly, so that the first driving piece is fastened relative to the lens assembly.

The fastening part includes a bracket and a second driving piece, the bracket is located on an outer side of the movable part, and the second driving piece is fastened relative to the bracket. For example, the second driving piece may be embedded in the bracket, to save space. The connecting component is connected between the bracket and the inner frame, that is, the fastening part is connected to the movable part by using the connecting component. A part of the connecting component connected to the movable part can move relative to a part of the connecting component connected to the fastening part, so that the movable part can move relative to the fastening part.

In an optional embodiment, the second driving piece and the first driving piece are disposed opposite to each other. When the image stabilization assembly responds to an electrical signal, magnetic field effect is formed between the second driving piece and the first driving piece, to drive the lens assembly to rotate relative to the fastening part. For example, the second driving piece and the first driving piece act by using an energized coil and a magnetic body to generate, by the energized coil, an electromagnetic force in a magnetic field of the magnetic body, so that the movable part and the lens assembly rotate together relative to the fastening part, to implement image stabilization.

In an optional embodiment, the camera module includes a driver chip. The driver chip is configured to control a magnitude and a time of a current output to the energized coil, to control a rotation amount of the movable part relative to the fastening part, to accurately compensate for shake of the camera module and implement image stabilization.

In an optional embodiment, the first driving piece includes a magnetic body, and the second driving piece includes a coil. There are a plurality of magnetic bodies and coils, and there is a one-to-one correspondence between the magnetic body and the coil. For example, the inner frame is a magnetic conductive sheet that conducts a magnetic force of the magnetic body. The inner frame is approximately rectangular, the magnetic body is fastened to each side of the inner frame, the bracket is approximately rectangular, the coil is disposed on each side of the bracket, and the coil is disposed opposite to the magnetic body.

In an optional embodiment, the fastening part further includes a connecting plate. The connecting plate is fastened to the bracket. The connecting plate is electrically connected to the coil. The connecting plate implements transmission of the electrical signal of the image stabilization assembly. For example, the connecting plate is enclosed around the bracket, and the connecting plate is a flexible rigid flexible printed circuit board, and is electrically connected to the coil in the second driving piece. The connecting plate may be fastened to the bracket by using a fastener or the like. The second driving piece is fastened to the connecting plate, to be fastened relative to the bracket.

The fastening part further includes a reinforcing plate, and the reinforcing plate is fastened to an outer side of the connecting plate, to increase structural strength of the connecting plate. In some other embodiments, the connecting plate may alternatively be some other mechanical parts provided with a conducting wire, and is electrically connected to the second driving piece by using the conducting wire. A specific structure of the connecting plate is not limited in this application.

In this embodiment, when the second driving piece includes the coil, the second driving piece is electrically connected to the connecting plate, so that the coil is energized. After being energized, the coil in the second driving piece generates an electromagnetic force with the first driving piece to push the first driving piece, so that the movable part and the lens assembly rotate together relative to the fastening part, thereby implementing image stabilization.

In this embodiment of this application, because the magnetic body in the first driving piece is fastened around the lens assembly, and the coil in the second driving piece is located at an outer side of the first driving piece, a magnetic field generated by a magnetic substance or a magnetic component (for example, a moving coil motor used for focusing) in the lens assembly does not affect relative motion between the second driving piece and the first driving piece, or has little impact, to reduce interference caused by the lens assembly to a stabilization operation of the image stabilization assembly.

In some other embodiments, for example, when the focusing assembly drives, by using a non-magnetic force, the lens assembly to adjust focus, or when the lens assembly includes the entire movable part without a magnetic substance or with weak magnetic, positions of the magnetic body and the coil may also be exchanged.

In this embodiment, the first driving piece includes the coil, and the second driving piece includes a magnetic piece. In this case, based on a small weight of the coil (which is also less than that of the magnetic body in the foregoing solution), an overall weight of the movable part is small, so that load of the connecting component is small, thereby helping reduce power consumption of the image stabilization assembly. In addition, the focusing assembly of the lens assembly may implement focusing in a non-magnetic driving manner, to avoid interference caused by the focusing assembly to a stabilization operation of the image stabilization assembly.

In an optional embodiment, the magnetic body is single-sided bipolar magnetized, or two-single-sided monopole magnetized. It may be understood that each magnetic body is provided with two pairs of poles. For example, each magnetic body includes an upper magnet and a lower magnet. The upper magnet and the lower magnet respectively correspond to an upper part and a lower part of the coil. It may be understood that, after the coil is energized, based on that directions of currents of the upper part and the lower part in the coil are opposite, when magnetic poles of the upper magnet and the lower magnet are opposite, a direction of an electromagnetic force between the upper magnet and the upper part is the same as a direction of an acting force between the lower magnet and the lower part, so that one side of the movable part is subject to the electromagnetic force in a same direction.

In an optional embodiment, the fastening part further includes a position detector. The position detector is configured to detect a position of the movable part relative to the fastening part. For example, the position detector performs position detection by using a change of the magnetic field.

In this embodiment, the movable part is provided with the magnetic body, and the position detector is fastened to the fastening part. When the movable part rotates relative to the fastening part, a magnetic field generated by the magnetic body of the movable part changes, so that the position detector of the fastening part detects a different magnetic field, thereby determining a position of the movable part relative to the fastening part. That is, a position of the position detector relative to the magnetic body can change.

In this embodiment, the position detector determines a rotation amount and a rotation angle of the lens assembly by detecting a position of the movable part relative to the fastening part, to determine a displacement of image stabilization of the camera module. After the movable part and the lens assembly rotate to target positions, a controller controls the first driving piece or the second driving piece to form a closed-loop system, to feed back the rotation amount and the rotation angle of the lens assembly relative to the fastening part.

In this embodiment, before the camera module performs shooting, the camera module can also initially correct the position of the movable part relative to the fastening part based on the position that is detected by the position detector and that is of the movable part relative to the fastening part, to avoid that positions of the lens assembly and the movable part relative to the fastening part are unfixed because the lens assembly and the movable part move relative to the fastening part due to gravity, so that positions of the lens assembly relative to the fastening part are consistent when the camera module performs shooting. That is, in this embodiment of this application, the camera module does not have a posture difference problem.

In an embodiment, the position detector uses a detection, driving, and control integrated chip (all in one).

In this embodiment, the position detector and the coil use the integrated chip, and a quantity of pins of the coil and the position detector is reduced in a manner of sharing a power supply and communication. A person skilled in the art can design the position detector based on an actual requirement. A specific driving manner of the position detector, a manner of electrically connecting the position detector to the coil, and the like are not limited in this application.

In an optional embodiment, the elastic connecting piece is made of a conductive material. The elastic connecting piece is electrically connected to the rigid board part and the fastening part. For example, one end of the elastic connecting piece is electrically connected to the rigid board part, and the other end is electrically connected to the connecting plate, to implement the electrical connection between the connecting plate and the rigid board part. Electrical signals of the image stabilization assembly are concentrated in the coil of the second driving piece and the position detector, and electrical signals of the second driving piece and the position detector are integrated into the connecting plate, so that the electrical signals of the image stabilization assembly can be transmitted to an outer side of the camera module by using the connecting plate.

In this embodiment, the elastic connecting piece not only connects the movable part and the fastening part, but also implements the electrical connection between the image stabilization assembly and the lens assembly, so that electrical signals of the image stabilization assembly can be integrated into the lens assembly by using the elastic connecting piece, thereby avoiding a case in which the electrical signals of the image stabilization assembly are led out to the outer side of the camera module by separately disposing a connector, reducing a quantity of connectors in the camera module, and reducing space occupied by the camera module.

In an optional embodiment, the bracket includes a first side wall and a second side wall that are disposed opposite to each other, one end of one part of the elastic connecting piece is fastened at a middle area of the first side wall, and the other end is fastened to the movable base; and one end of the other part of the elastic connecting piece is fastened at a middle area of the second side wall, and the other end is fastened to the movable base.

The connecting plate includes two lead-out ends disposed opposite to each other. The lead-out end is configured to contact with each spring plate, to implement the electrical connection between the connecting plate and the elastic connecting piece. One lead-out end is connected to the elastic connecting piece fastened on the first side wall, and the other lead-out end is connected to the elastic connecting piece fastened on the second side wall.

In this embodiment, the elastic connecting pieces are respectively fastened at middle positions of the first side wall and the second side wall that are oppositely disposed on the bracket, to reduce a distance between the spring plates that are symmetrically arranged, so that the lead-out ends of the connecting plate electrically connected to each spring plate are centralized, thereby reducing outlets of the lead-out ends in the connecting plate, and facilitating the electrical connection between the elastic connecting piece and the connecting plate.

In an optional embodiment, the bracket further includes a third side wall connected between the first side wall and the second side wall, the third side wall is provided with avoidance space, and the flexible board part extends through the avoidance space to the outer side of the image stabilization assembly.

In this embodiment, the avoidance space not only provides lead-out space of the flexible board part led out to the outer side of the camera module, but also provides deformation space of the flexible board part, to avoid interference between the flexible board part and the bracket in an image stabilization process of the camera module, thereby affecting rotation of the lens assembly.

In an optional embodiment, the elastic connecting piece includes a spring plate and an extension piece, one end of the spring plate is fastened to the movable base, and the other end is fastened to the fastening part; and the extension piece extends from the end of the spring plate fastened to the movable base to the rigid board part, and is electrically connected to the rigid board part. The elastic connecting piece is made of a conductive material, to implement the electrical connection between the connecting plate in the fastening part and the rigid board part.

In this embodiment, the spring plate supports the movable part and the lens assembly. In an image stabilization process of the camera module, the movable part rotates relative to the fastening part, and the spring plate deforms. Because both ends of the extension piece are fixedly connected relative to the movable part, the extension piece does not deform in the image stabilization process of the camera module, thereby ensuring stability of the electrical connection between the elastic connecting piece and the rigid board part, and improving reliability of the camera module.

In an optional embodiment, the extension piece and the spring plate are integrally formed. In this embodiment, the extension piece and the spring plate are integrally formed to simplify design of the elastic connecting piece.

In an optional embodiment, the fastening part further includes an outer cover, and the outer cover is installed on the bracket and is located around the bracket. That is, the outer cover is enclosed around the movable part. The outer cover is a housing of the camera module, to prevent the camera module from damaging the image stabilization assembly and the lens assembly in an assembly process.

In an optional embodiment, the outer cover has a limiting part, and the limiting part protrudes in a direction close to the lens assembly and is spaced from the lens assembly. The limiting part is configured to limit an angle at which the lens assembly rotates relative to the fastening part.

In an optional embodiment, the connecting component includes a rigid connecting piece and a flexible connecting piece, the rigid connecting piece is fastened around the lens assembly, and at least a part of the rigid connecting piece is enclosed around the rigid board part; and one end of the flexible connecting piece is fastened to a side edge that is of the rigid connecting piece and that is close to the rigid board part, and the other end is fastened to the fastening part.

In this embodiment, the at least the part of the rigid connecting piece is enclosed around the rigid board part, and the flexible connecting piece is fastened to the side that is of the rigid connecting piece and that is close to the rigid board part, so that the flexible connecting piece is close to the rigid board part in the Z-axis direction, thereby reducing the spacing between the rotation center of the movable part and the rigid board part. If the rotation angle of the lens assembly meets the requirement, the reactive force generated by the flexible board part is small, thereby facilitating image stabilization of the image stabilization assembly.

In this embodiment, the flexible connecting piece is fastened to the side edge of the rigid connecting piece, thereby avoiding that when the flexible connecting piece is fastened to a side that is of the rigid connecting piece and that is away from the rigid board part, a spacing between the flexible connecting piece and the rigid board part is increased due to a thickness of the rigid connecting piece, so that the coordinate of the rotation center of the movable part in the Z-axis direction may be equal to the coordinate of the rigid board part in the Z-axis direction.

According to a second aspect, this application further provides an electronic device. The electronic device includes a housing and the foregoing camera module, and the camera module is installed on the housing.

In this embodiment of this application, the camera module in the electronic device includes a lens assembly and an image stabilization assembly that drives the lens assembly to rotate. A spacing between a rotation center of the lens assembly and a rigid board part of a rigid flexible printed circuit board in the lens assembly is small. Therefore, if a rotation angle of the lens assembly meets a requirement, an offset of the rigid board part is reduced, and a deformation of a flexible board part led out from the rigid board part is reduced, so that a reactive force generated by the flexible board part is small, thereby facilitating improvement of image stabilization performance of the camera module in the electronic device.

DESCRIPTION OF EMBODIMENTS

The following describes embodiments of this application with reference to the accompanying drawings in embodiments of this application.

Figure 1:
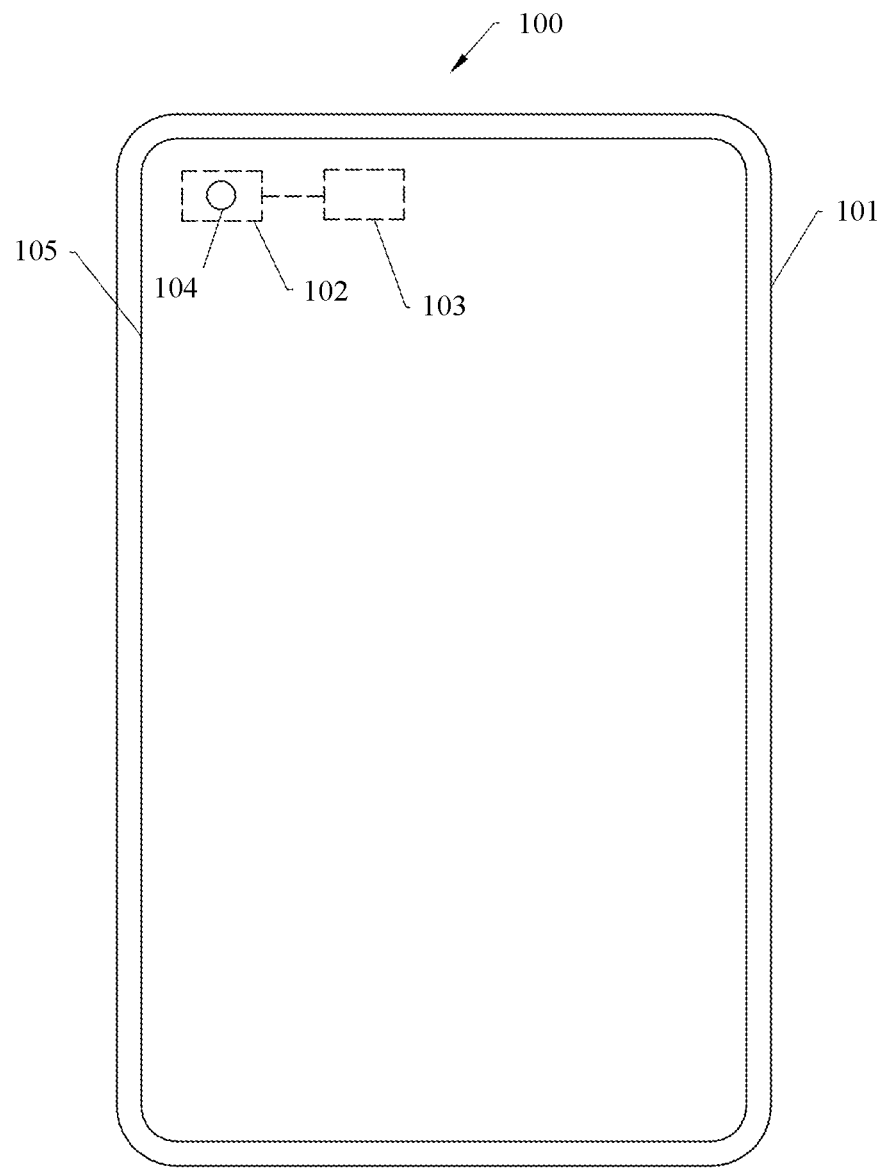
FIG. 1 is a schematic diagram of a structure of an electronic device according to an embodiment of this application.

FIG. 1 is a schematic diagram of a structure of an electronic device 100 according to an embodiment of this application. An embodiment of this application provides an electronic device 100. The electronic device 100 includes a housing 101 and a camera module 102. The camera module 102 is installed on the housing 101. The camera module 102 can enable the electronic device 100 to implement a function such as obtaining an image or making an instant video call. The electronic device 100 may be a product such as a mobile phone, a tablet computer, a notebook computer, a vehicle-mounted device, a wearable device, or a drone. The wearable device may be a smart band, a smart watch, augmented reality (AR) glasses, virtual reality technology (virtual reality, VR) glasses, or the like. In this embodiment of this application, an example in which the electronic device 100 is a mobile phone is used for description.

In some embodiments, the electronic device 100 further includes an image processor 103. The image processor 103 and the camera module 102 are in a communication connection, and the image processor 103 is configured to obtain image data from the camera module 102 and process the image data.

In some embodiments, the electronic device 100 further includes a rear cover 105 provided with a transparent region 104. The camera module 102 collects light outside the electronic device 100 by using the transparent region 104 of the rear cover 105. It may be understood that the camera module 102 is used as a rear-facing camera module of the electronic device 100.

In some other embodiments, the electronic device 100 may further include a display module (not shown in the figure) configured to display a picture. The camera module 102 collects light outside the electronic device 100 by using a transparent region of the display module, and the camera module 102 is used as a front-facing camera module of the electronic device 100. In other words, the camera module 102 may be used as the rear-facing camera module of the electronic device 100, or may be used as the front-facing camera module of the electronic device 100. This is not strictly limited in this embodiment of this application.

Figure 2:
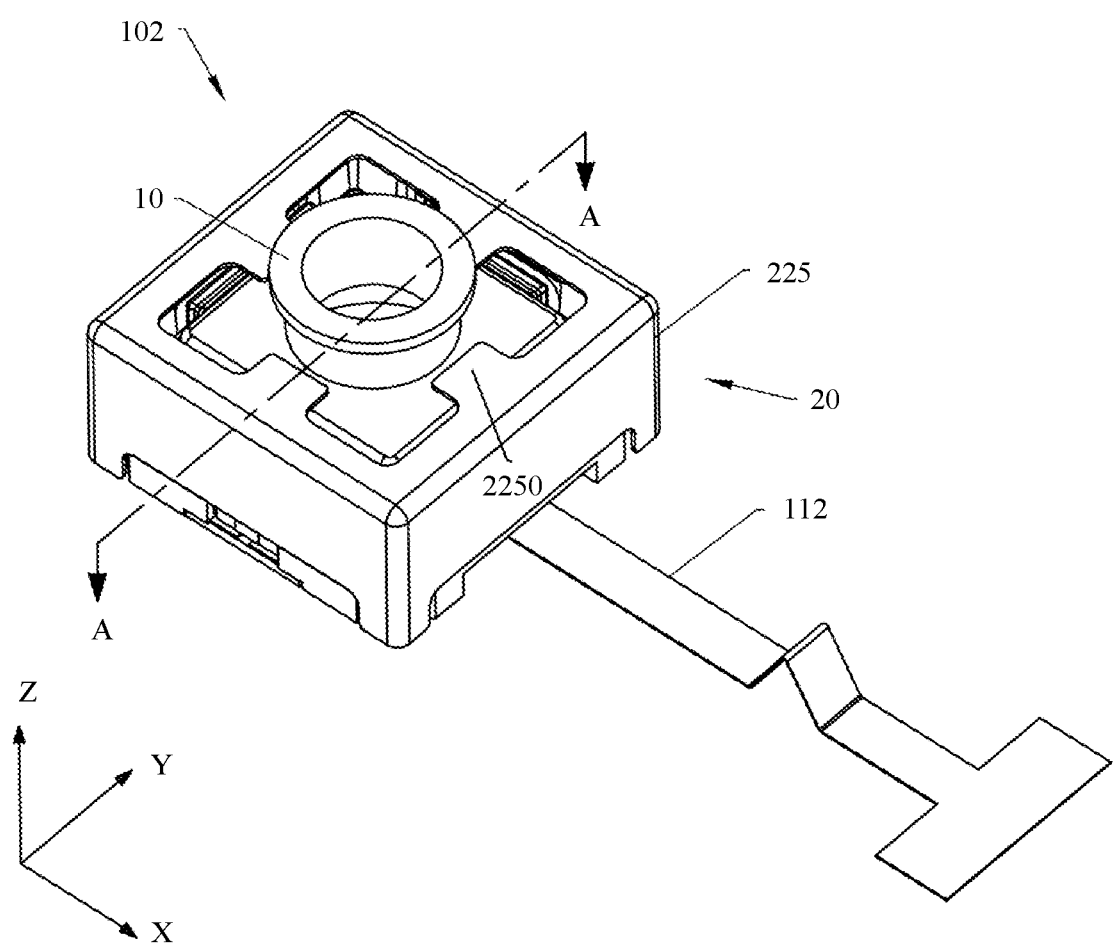
FIG. 2 is a schematic diagram of a structure of a camera module of the electronic device shown in FIG. 1 in some embodiments.

FIG. 2 is a schematic diagram of a structure of the camera module 102 of the electronic device 100 shown in FIG. 1 in some embodiments. The camera module 102 includes a lens assembly 10 and an image stabilization assembly 20. A main part of the lens assembly 10 is located on an inner side of the image stabilization assembly 20, and a partial structure of the lens assembly 10 extends out to an outer side of the image stabilization assembly 20. The image stabilization assembly 20 is configured to drive the lens assembly 10 to rotate, to compensate for shake of the camera module 102 in a shooting process of the electronic device 100, thereby implementing image stabilization.

Figure 3:
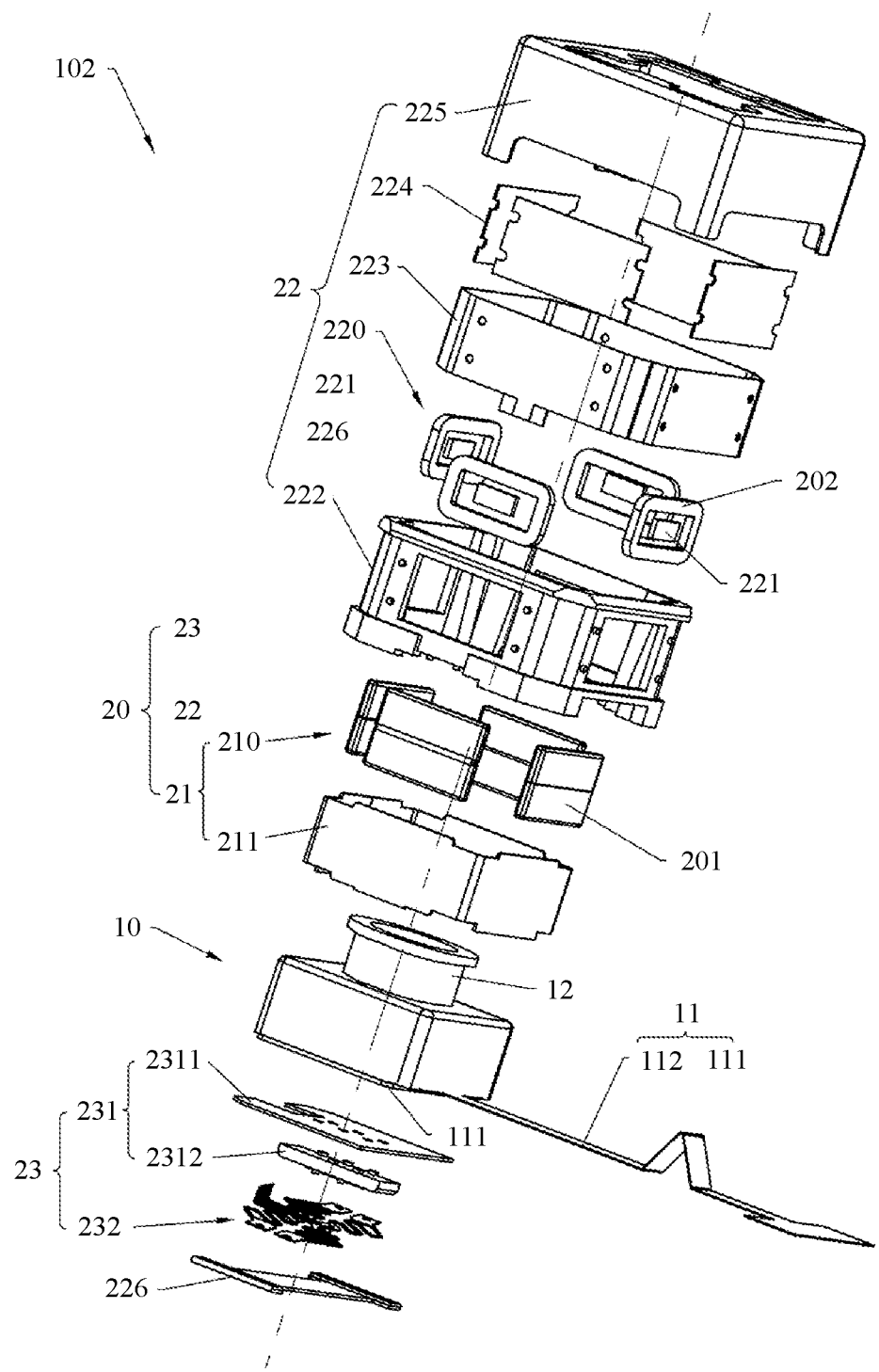
FIG. 3 is a schematic diagram of a partially exploded structure of the camera module shown in FIG. 2.
Figure 4:
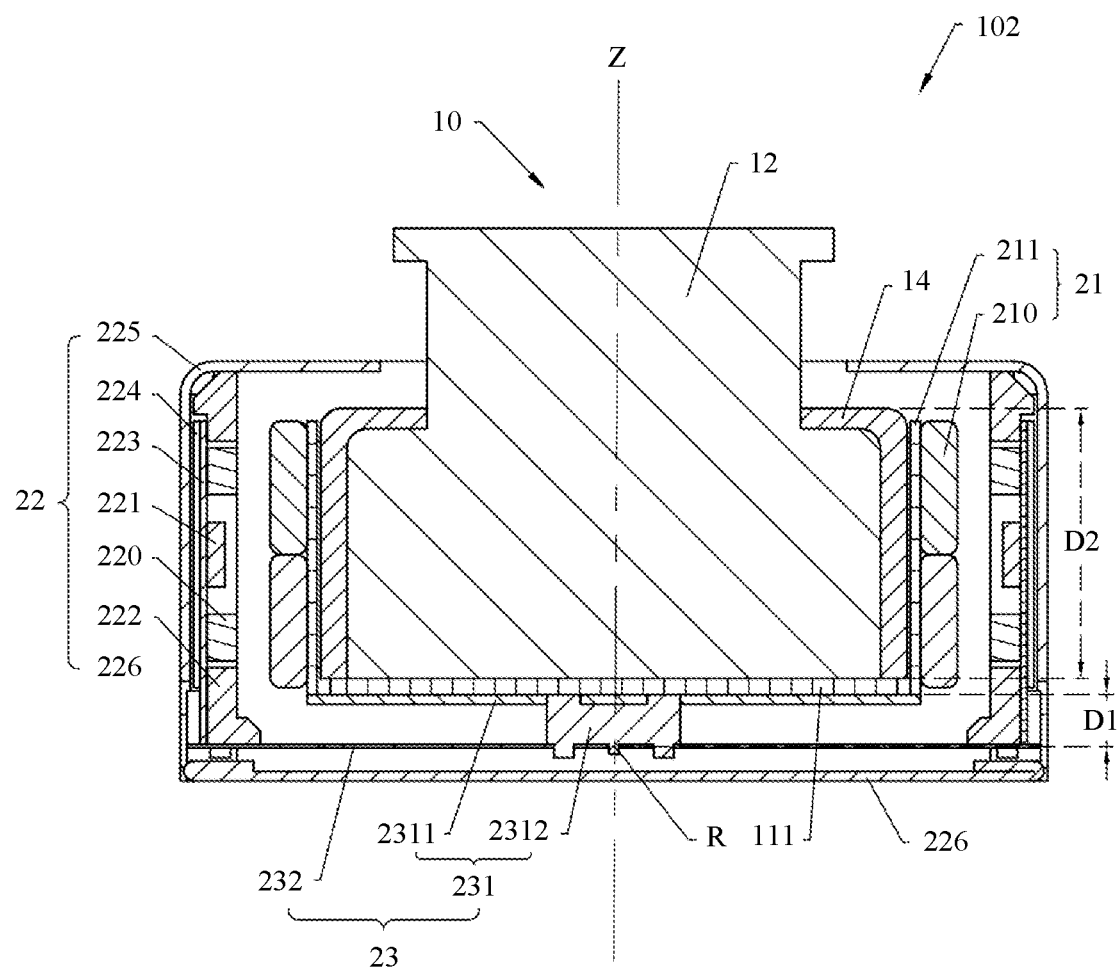
FIG. 4 is a schematic cross-sectional view of the camera module shown in FIG. 2 along A-A.

Refer to FIG. 3 and FIG. 4. FIG. 3 is a schematic diagram of a partially exploded structure of the camera module 102 shown in FIG. 2, and FIG. 4 is a schematic cross-sectional view of the camera module 102 shown in FIG. 2 along an A-A line. The lens assembly 10 includes a rigid flexible printed circuit board 11 (RFPCB), a lens 12, and an image sensor (not shown in the figure). The image sensor is electrically connected to the rigid flexible printed circuit board 11. The image sensor is a device that converts an optical image into an electrical signal. The image sensor may be a charge-coupled device (CCD), or may be a complementary metal oxide semiconductor (CMOS). This is not limited in this application. After passing through the lens 12, external light falls into a photosensitive surface of the image sensor, and is imaged on the image sensor. The image sensor is electrically connected to the rigid flexible printed circuit board 11, so that an electrical signal formed by the image sensor is transmitted to another component by using the rigid flexible printed circuit board 11.

The rigid flexible printed circuit board 11 is a circuit board having characteristics of both a rigid printed circuit board (PCB) and a flexible printed circuit board (FPC). For example, the rigid flexible printed circuit board 11 includes a rigid board part 111 and a flexible board part 112 led out from the rigid board part 111. The flexible board part 112 is led out from the rigid board part 111 to an outer side of the image stabilization assembly 20, and is configured to electrically connect to another component in the electronic device 100, for example, an image processor, to transfer a signal of the lens assembly 10 to the image processor. For example, the rigid board part 111 may include a reinforcement structure, for example, a reinforcement steel plate. This is not limited in this application.

In some implementations, the rigid board part 111 may be a rigid printed circuit board (with a cabling for electrically connecting the flexible board part 112). The rigid printed circuit board may be connected to another component in the lens assembly 10 by using various methods, to dispose the rigid board part 111 in the lens assembly 10. At the same time, various components (for example, the image sensor) are installed on the rigid board part 111, and are electrically connected to the flexible board part 112 by using a process, so that a signal obtained from the image sensor is transmitted to another component (for example, the image processor) by using the flexible board part 112. In some other implementations, the rigid board part 111 may also place a rigid printed circuit board and a component on a base board. The rigid printed circuit board implements electrical signal connection to the image sensor by using a process, for example, wire bonding, and leads out a signal cable by using the flexible board part 112. A person skilled in the art can design the rigid flexible printed circuit board 11 based on an actual requirement. A specific structure, a forming process, and the like of the rigid flexible printed circuit board 11 are not limited in this application.

In this embodiment of this application, because the flexible board part 112 may be bent and deformed, the flexible board part 112 may be fastened at a required position through bending and deformation, thereby facilitating arrangement of other components in the electronic device 100. The lens 12 is fastened relative to the rigid board part 111, to ensure stability of the lens 12.

In some embodiments, the image stabilization assembly 20 includes a movable part 21, a fastening part 22, and a connecting component 23. The movable part 21 is fastened to the lens assembly 10. The fastening part 22 is connected to the movable part 21 by using the connecting component 23. The movable part 21 is configured to rotate relative to the fastening part 22 by using the connecting component 23. For example, the movable part 21 is fastened around the lens assembly 10, and the fastening part 22 is enclosed around the movable part 21, and is spaced from the movable part 21. The connecting component 23 connects the fastening part 22 and the movable part 21. It may be understood that the fastening part 22 is of a hollow structure, and the movable part 21 is located on an inner side of the fastening part 22. The movable part 21 is suspended relative to the fastening part 22, and the connecting component 23 supports the movable part 21.

In this embodiment of this application, when the image stabilization assembly 20 responds to the electrical signal, the movable part 21 rotates relative to the fastening part 22. Because the movable part 21 is fastened to the lens assembly 10, when the movable part 21 rotates relative to the fastening part 22, the movable part 21 can drive the lens assembly 10 to rotate together relative to the fastening part 22. That is, the image stabilization assembly 20 is configured to respond to the electrical signal, and drive the lens assembly 10 to rotate relative to the fastening part 22, to compensate for shake of the camera module 102, thereby implementing image stabilization. The fastening part 22 and the movable part 21 are spaced, to avoid that rotation of the movable part 21 is affected by interference between the fastening part 22 and the movable part 21 when the movable part 21 rotates relative to the fastening part 22, thereby ensuring reliability of the image stabilization assembly 20.

It may be understood that, in this embodiment of this application, the fastening part 22 is connected to the movable part 21 by using the connecting component 23. That is, the connecting component 23 is directly connected to the movable part 21. In some other embodiments, the connecting component 23 can also be connected to the lens assembly 10, to be indirectly connected to the movable part 21. A specific connection manner between the connecting component 23 and the movable part 21 is not limited in this embodiment of this application.

In a conventional optical image stabilization system, in an image stabilization process of the camera module, a relative position between the lens and the image sensor continuously changes, so that a position at which the lens projects an image on the image sensor continuously changes. Consequently, the image sensor needs a large photosensitive surface, to meet imaging requirements of lenses at different angles.

In this embodiment of this application, in a process in which the image stabilization assembly 20 drives the lens assembly 10 to rotate, the lens 12 and the image sensor rotate together, that is, positions of the lens 12 and the image sensor remain unchanged, and a position of an image projected by the lens 12 on the image sensor is fixed, so that a small photosensitive surface provided on the image sensor can meet an imaging requirement, thereby reducing a volume of the image sensor.

In some embodiments, a groove is disposed on a side that is of the rigid board part 111 and that faces the lens 12. The image sensor is partially or completely accommodated in the groove, to reduce a height of the lens assembly 10, thereby facilitating miniaturization of the camera module 102. In another embodiment, the image sensor may also be disposed on a surface of the rigid board part 111. This is not limited in this application.

In some embodiments, as shown in FIG. 4, the lens 12 includes a base 14, and the base 14 is fastened to the rigid board part 111. The base 14 is a hollow structure with openings at two ends. The base 14 is an outermost structure of the lens assembly 10. The movable part 21 is fastened around the base 14. The lens 12 further includes a focusing assembly, a lens tube, and a lens group. The focusing assembly is configured to implement automatic focusing of the camera module 102. For example, the focusing assembly is fastened to an inner side of the base 14, the lens assembly is installed to an inner side of the lens tube, and the lens tube and the lens assembly are installed to an inner side of the focusing assembly. The focusing assembly drives, by using an electromagnetic force, the lens tube and the lens assembly to move along an optical axis direction of the lens assembly, to change an image distance to obtain a clear image and implement automatic focusing of the camera module 102.

In this embodiment of this application, the camera module 102 drives, by using the focusing assembly, the lens tube and the lens group to move, to implement focusing, and drives, by using the image stabilization assembly 20, the lens 12 to rotate, to implement image stabilization. In other words, a focusing function and an image stabilization function in the camera module 102 are driven by different structures. This helps implement large-angle image stabilization of the camera module 102.

A person skilled in the art can design the focusing assembly based on an actual requirement. A specific driving manner, a structure, and the like of the focusing assembly are not limited in this application. In some other embodiments, the lens assembly 10 may alternatively not be provided with the focusing assembly. This is not limited in this application.

Still refer to FIG. 3 and FIG. 4. The movable part 21 includes a first driving piece 210 and an inner frame 211. The inner frame 211 is located around the lens assembly 10. The first driving piece 210 is fastened around the inner frame 211. The first driving piece 210 is fastened by using the inner frame 211, and the inner frame 211 is fastened around the lens assembly 10, so that the first driving piece 210 is fastened relative to the lens assembly 10.

The fastening part 22 includes a second driving piece 220 and a bracket 222. The bracket 222 is located on an outer side of the movable part 21. The second driving piece 220 is fastened relative to the bracket 222. For example, the second driving piece 220 may be embedded in the bracket 222, to save space.

The connecting component 23 is connected between the bracket 222 and the inner frame 211, that is, the fastening part 22 is connected to the movable part 21 by using the connecting component 23. A part of the connecting component 23 connected to the movable part 21 can move relative to a part of the connecting component 23 connected to the fastening part 22, so that the movable part 21 can move relative to the fastening part 22.

The second driving piece 220 and the first driving piece 210 are disposed opposite to each other. When the image stabilization assembly 20 responds to an electrical signal, magnetic field effect is formed between the second driving piece 220 and the first driving piece 210, to drive the lens assembly 10 to rotate relative to the fastening part 22. For example, the second driving piece 220 and the first driving piece 210 act by using an energized coil and a magnetic body to generate, by the energized coil, an electromagnetic force in a magnetic field of the magnetic body, so that the movable part 21 and the lens assembly 10 rotate together relative to the fastening part 22, to implement image stabilization. For example, the camera module 102 includes a driver chip. The driver chip is configured to control a magnitude and a time of a current output to the energized coil, to control a rotation of the movable part 21 relative to the fastening part 22, to accurately compensate for shake of the camera module 102 and implement image stabilization.

In some embodiments, the first driving piece 210 includes a magnetic body 201, and the second driving piece 220 includes a coil 202. There are a plurality of magnetic bodies 201 and coils 202, and there is a one-to-one correspondence between the magnetic body 201 and the coil 202. For example, the inner frame 211 is a magnetic conductive sheet that conducts a magnetic force of the magnetic body 201. The inner frame 211 is approximately rectangular, the magnetic body 201 is fastened to each side of the inner frame 211, the bracket 222 is approximately rectangular, the coil 202 is disposed on each side of the bracket 222, and the coil 202 is disposed opposite to the magnetic body 201.

In some embodiments, as shown in FIG. 3 and FIG. 4, the fastening part 22 further includes a connecting plate 223. The connecting plate 223 is fastened to the bracket 222. The connecting plate 223 is electrically connected to the second driving piece 220, and the connecting plate 223 implements transmission of an electrical signal of the image stabilization assembly 20. For example, the connecting plate 223 is enclosed around the bracket 222, and the connecting plate 223 is a flexible rigid flexible printed circuit board, and is electrically connected to the coil 202 in the second driving piece 220. The connecting plate 223 may be fastened to the bracket 222 by using a fastener or the like. The second driving piece 220 is fastened to the connecting plate 223, to be fastened relative to the bracket 222.

The fastening part 22 further includes a reinforcing plate 224, and the reinforcing plate 224 is fastened to an outer side of the connecting plate 223 to increase structural strength of the connecting plate 223. In some other embodiments, the connecting plate 223 may alternatively be some other mechanical parts provided with a conducting wire, and is electrically connected to the second driving piece 220 by using the conducting wire. A specific structure of the connecting plate 223 is not limited in this application.

In this embodiment, when the second driving piece 220 includes the coil 202, the second driving piece 220 is electrically connected to the connecting plate 223, so that the coil 202 is energized. After being energized, the coil 202 in the second driving piece 220 generates an electromagnetic force with the first driving piece 210 to push the first driving piece 210, so that the movable part 21 and the lens assembly 10 rotate together relative to the fastening part 22, thereby implementing image stabilization.

In this embodiment of this application, because the magnetic body 201 in the first driving piece 210 is fastened around the lens assembly 10, and the coil 202 in the second driving piece 220 is located at an outer side of the first driving piece 210, a magnetic field generated by a magnetic substance or a magnetic component (for example, a moving coil motor used for focusing) in the lens assembly 10 does not affect relative motion between the second driving piece 220 and the first driving piece 210, or has little impact, to reduce interference caused by the lens assembly 10 to a stabilization operation of the image stabilization assembly 20.

In some embodiments, the magnetic body 201 is single-sided bipolar magnetized, or two-single-sided monopole magnetized. It may be understood that each magnetic body 201 is provided with two pairs of poles. As shown in FIG. 4, each magnetic body 201 includes an upper magnet and a lower magnet. The upper magnet and the lower magnet respectively correspond to an upper part and a lower part of the coil 202. It may be understood that, after the coil 202 is energized, based on that directions of currents of the upper part and the lower part in the coil 202 are opposite, when magnetic poles of the upper magnet and the lower magnet are opposite, a direction of an electromagnetic force between the upper magnet and the upper part is the same as a direction of an acting force between the lower magnet and the lower part, so that one side of the movable part 21 is subject to the electromagnetic force in a same direction.

In this embodiment, when two sides of the movable part 21 that are disposed opposite to each other are subject to electromagnetic forces in opposite directions, the movable part 21 rotates relative to the fastening part 22. For example, in FIG. 4, both the magnetic body 201 and the coil 202 on the left generate an upward electromagnetic force on the movable part 21, and both the magnetic body 201 and the coil 202 on the right generate a downward electromagnetic force on the movable part 21, so that the movable part 21 rotates clockwise relative to the fastening part 22.

It may be understood that, this embodiment describes an example in which the coil 202 (the second driving piece 220) belongs to the fastening part 22 and the magnetic body 201 (the first driving piece 210) belongs to the movable part 21. In some other embodiments, for example, when the focusing assembly drives, by using a non-magnetic force, the lens assembly 10 to adjust focus, or when the lens assembly 10 includes the entire movable part 21 without a magnetic substance or with weak magnetic, positions of the magnetic body 201 and the coil 202 may also be exchanged.

In this embodiment, the first driving piece 210 includes the coil 202, and the second driving piece 220 includes a magnetic piece. In this case, based on a small weight of the coil 202 (which is also less than that of the magnetic body 201 in the foregoing solution), an overall weight of the movable part 21 is small, so that load of the connecting component 23 is small, thereby helping reduce power consumption of the image stabilization assembly 20. In addition, the focusing assembly of the lens assembly 10 may implement focusing in a non-magnetic driving manner, to avoid interference caused by the focusing assembly to a stabilization operation of the image stabilization assembly 20.

It may be understood that, in this embodiment, the image stabilization assembly 20 implements image stabilization of the camera module 102 by using a voice coil motor (VCM). In some other embodiments, the image stabilization assembly 20 may alternatively implement image stabilization of the camera module 102 by using a shape memory alloy (SMA) motor. For example, the connecting component 23 includes a plurality of shape memory alloys. Based on that the shape memory alloy may deform under different thermal load conditions to present different forms, the image stabilization assembly 20 controls power-on statuses of the plurality of shape memory alloys, so that the shape memory alloy shrinks and deforms due to heat, to drive the lens assembly 10 to rotate relative to the fastening part 22, thereby implementing image stabilization of the camera module 102. A specific driving manner and an implementation structure of the image stabilization assembly 20 are not limited in this application.

In an embodiment, as shown in FIG. 3 and FIG. 4, the fastening part 22 further includes a position detector 221.

The position detector 221 is configured to detect a position of the movable part 21 relative to the fastening part 22. For example, the position detector 221 performs position detection by using a change of the magnetic field.

In this embodiment, the movable part 21 is provided with the magnetic body 201, and the position detector 221 is fastened to the fastening part 22. When the movable part 21 rotates relative to the fastening part 22, a magnetic field generated by the magnetic body 201 of the movable part 21 changes, so that the position detector 221 of the fastening part 22 detects different magnetic fields, thereby determining the position of the movable part 21 relative to the fastening part 22. That is, a position of the position detector 221 relative to the magnetic body 201 can change.

In this embodiment, the position detector 221 determines a rotation amount and a rotation angle of the lens assembly 10 by detecting a position of the movable part 21 relative to the fastening part 22, to determine a displacement of image stabilization of the camera module 102. After the movable part 21 and the lens assembly 10 rotate to target positions, a controller controls the first driving piece 210 or the second driving piece 220 to form a closed-loop system, to feed back the rotation amount and the rotation angle of the lens assembly 10 relative to the fastening part 22.

In this embodiment, before the camera module 102 performs shooting, the camera module 102 can also initially correct the position of the movable part 21 relative to the fastening part 22 based on the position that is detected by the position detector 221 and that is of the movable part 21 relative to the fastening part 22, to avoid that positions of the lens assembly 10 and the movable part 21 relative to the fastening part 22 are unfixed because the lens assembly 10 and the movable part 21 move relative to the fastening part 22 due to gravity, so that positions of the lens assembly 10 relative to the fastening part 22 are consistent when the camera module 102 performs shooting. That is, in this embodiment of this application, the camera module 102 does not have a posture difference problem.

As shown in FIG. 4, in some embodiments, the position detector 221 is embedded on an inner side of the second driving piece 220. For example, the position detector 221 is fastened to the connecting plate 223, the position detector 221 is located on the inner side of the second driving piece 220 fastened to the connecting plate 223, and the position detector 221 is electrically connected to the connecting plate 223. In this case, both the position detector 221 and the second driving piece 220 are electrically connected to an external component by using the connecting plate 223, to simplify a circuit design of the fastening part 22, and enable spatial multiplexing of the position detector 221 and the second driving piece 220, thereby facilitating miniaturization of the camera module 102. In some other embodiments, the position detector 221 may also be disposed at another position. This is not limited in this application.

In an embodiment, the position detector 221 uses a detection/driving/control integrated chip (all in one). In this embodiment, the position detector 221 and the coil 202 use the integrated chip, and a quantity of pins of the coil 202 and the position detector 221 is reduced in a manner of sharing a power supply and communication. A person skilled in the art can design the position detector 221 based on an actual requirement. A specific driving manner of the position detector 221, a manner of electrically connecting the position detector 221 to the coil 202, and the like are not limited in this application.

Refer to FIG. 2 to FIG. 4. In embodiment, the fastening part 22 further includes an outer cover 225, and the outer cover 225 is installed on the bracket 222 and is located around the bracket 222. That is, the outer cover 225 is enclosed around the movable part 21. The outer cover 225 is a housing of the camera module 102, to prevent the camera module 102 from damaging the image stabilization assembly 20 and the lens assembly 10 in an assembly process.

As shown in FIG. 2, the outer cover 225 has a limiting part 2250. The limiting part 2250 protrudes in a direction close to the lens assembly 10 and is spaced from the lens assembly 10. The limiting part 2250 is configured to limit an angle at which the lens assembly 10 rotates relative to the fastening part 22.

Still refer to FIG. 2 and FIG. 3. The flexible board part 112 is led out from the rigid board part 111 to an outer side of the image stabilization assembly 20. The flexible board part 112 is configured to electrically connect to another component in the electronic device 100, to transfer an electrical signal of the camera module 102 to the another component. It may be understood that, based on that one end of the flexible board part 112 is fixedly connected to the rigid board part 111, and the other end is fixedly connected to a component inside the electronic device 100, in a process in which the image stabilization assembly 20 drives the lens assembly 10 to rotate relative to the fastening part 22, the rotated lens 12 and the rigid board part 111 drive the flexible board part 112, so that the flexible board part 112 deforms. In this case, the flexible board part 112 generates a reactive force on the rigid board part 111, and therefore the image stabilization assembly 20 is interfered to drive the lens assembly 10 to rotate relative to the fastening part 22.

In this embodiment, the movable part 21 rotates relative to the fastening part 22 by using the connecting component 23, and the connecting component 23 is connected to positions of the movable part 21 and the fastening part 22, so that a rotation center of the movable part 21 relative to the fastening part 22 is determined. The movable part 21 is fastened relative to the lens assembly 10, and the rotation center of the movable part 21 is the same as a rotation center of the lens assembly 10. A larger spacing between the rotation center of the lens assembly 10 and the rigid board part 111 in the lens assembly 10 indicates, if a rotation angle of the lens assembly 10 meets a requirement, a larger offset of the rigid board part 111, and further indicates a larger deformation generated by the flexible board part 112 led out from the rigid board part 111.

In some possible implementations, in camera module of pan-tilt-zoom, an upper spring plate and a lower spring plate are respectively disposed at two ends of the base of the lens assembly, and the movable part rotates relative to the fastening part by using the upper spring plate and the lower spring plate. In this case, a rotation center of the movable part rotating relative to the fastening part is located in a middle area of the upper spring plate and the lower spring plate, that is, located in a middle of the base. A spacing between the rotation center of the lens assembly and the rigid board part is large, and therefore a rotation amplitude of the rigid board part is large in a rotation process of the lens assembly, and a deformation of the flexible board part is large. As a result, the flexible board part generates a large reactive force, thereby affecting image stabilization of the camera module.

Still refer to FIG. 4. A distance between a rotation center R of the movable part 21 of the camera module 102 and the rigid board part 111 in a Z-axis direction is a first distance D1, and the Z-axis direction is a direction of an optical axis of the lens 12. The first distance D1 is less than half of a shoulder height D2 of the lens 12. The shoulder height D2 of the lens 12 is a thickness of the base 14 in the Z-axis direction. It may be understood that a side that is of the rigid board part 111 and that faces the base 14 is used as a reference plane, a side that is of the base 14 and that is away from the rigid board part 111 is a "shoulder" part of the lens 12, and the shoulder height D2 of the lens 12 is defined as the thickness of the base 14 in the Z-axis direction.

The first distance D1 is less than half of the shoulder height D2 of the lens 12, that is, a spacing between the rotation center R of the movable part 21 and the rigid board part 111 is less than half of the thickness of the base 14. The rotation center R of the movable part 21 relative to the fastening part 22 is determined based on a center of the connecting component 23, that is, the center of the connecting component 23 is located at R.

In this embodiment, a spacing between the rotation center R of the movable part 21 and the rigid board part 111 is less than half of the thickness of the base 14, that is, the rotation center R of the movable part 21 deviates from a middle part of the base 14 and is close to the rigid board part 111. This reduces the spacing between the rotation center R of the movable part 21 and the rigid board part 111, reduces an offset of an edge of the rigid board part 111 if a rotation angle of the lens assembly 10 meets a requirement, and therefore reduces a deformation of the flexible board part 112 led out from the edge of the rigid board part 111, so that a reactive force generated by the flexible board part 112 is small, thereby facilitating image stabilization of the image stabilization assembly 20.

In some embodiments, a coordinate of the rotation center R of the movable part 21 in a Z-axis direction is close to or equal to a coordinate of the rigid board part 111 in the Z-axis direction, and the Z-axis direction is a direction of an optical axis of the lens. That the rotation center R of the movable part 21 is located above or below the rigid board part 111 indicates that the coordinate of the rotation center R of the movable part 21 in the Z-axis direction is close to the coordinate of the rigid board part 111 in the Z-axis direction. For example, when the coordinate of the rigid board part 111 in the Z-axis direction is 0, that the coordinate of the rotation center R of the movable part 21 is 0.1 or –0.1 indicates that the rotation center R of the movable part 21 is close to the rigid board part 111.

In this embodiment, the coordinate of the rotation center R of the movable part 21 in the Z-axis direction is close to or equal to the coordinate of the rigid board part 111 in the Z-axis direction, that is, the spacing between the rotation center R of the movable part 21 and the rigid board part 111 is small. If a rotation angle of the lens assembly 10 meets a requirement, an offset of an edge of the rigid board part 111 is small, and further a deformation of the flexible board part 112 led out from the edge of the rigid board part 111 is small, so that a reactive force generated by the flexible board part 112 is small, thereby facilitating image stabilization of the image stabilization assembly 20.

As shown in FIG. 3 and FIG. 4, in some embodiments, the connecting component 23 includes a movable base 231 and an elastic connecting piece 232. The movable base 231 is fastened to a side that is of the rigid board part 111 and that is away from the lens 12. That is, the movable base 231 is fastened to a bottom surface of the lens assembly 10. One end of the elastic connecting piece 232 is connected to the movable base 231, and the other end is connected to the fastening part 22. It may be understood that the movable part 21 is connected to the fastening part 22 by using the elastic connecting piece 232, and the elastic connecting piece 232 supports the movable part 21, so that a connection position between the elastic connecting piece 232 and the movable base 231 determines the rotation center R of the movable part 21.

The movable base 231 is directly connected to the rigid board part 111, to reduce a distance between the rigid board part 111 and a side that is of the movable base 231 and that is away from the rigid board part 111. For example, one end of the elastic connecting piece 232 is fastened to the side that is of the movable base 231 and that is away from the rigid board part 111, so that the rotation center R of the movable part 21 is located on the movable base 231, and therefore the rotation center R of the movable part 21 is close to the rigid board part 111. In another embodiment, one end of the elastic connecting piece 232 can also be fastened to a side edge of the movable base 231, so that the rotation center R of the movable part 21 is close to or equal to the rigid board part 111. This is not limited in this application.

In this embodiment of this application, one end of the elastic connecting piece 232 is connected to the movable base 231, and the other end is connected to the fastening part 22, so that the rotation center R of the movable part 21 is located on the movable base 231. In addition, the movable base 231 is fastened to the side that is of the rigid board part 111 and that is away from the lens 12, so that the rotation center R of the movable part 21 is close to the rigid board part 111, thereby reducing the spacing between the rotation center R of the movable part 21 and the rigid board part 111.

As shown in FIG. 4, this embodiment describes an example in which the elastic connecting piece 232 is fastened at a middle area of the movable base 231. In another embodiment, the elastic connecting piece 232 can also be fastened at another area of the movable base 231, for example, a diagonal area of the movable base 231. This is not limited in this application.

Still refer to FIG. 3 and FIG. 4. The movable base 231 includes a first base 2311 and a second base 2312. The first base 2311 is located on a side that is of the rigid board part 111 and that is away from the lens 12. The second base 2312 is fastened to a side that is of the first base 2311 and that is away from the lens assembly 10. One end of the elastic connecting piece 232 is fastened to the second base 2312, and a gap is formed between the elastic connecting piece 232 and the first base 2311. For example, the second base 2312 protrudes along a side that is of the first base 2311 and that is facing away from the lens assembly 10, so that a gap is formed between the elastic connecting piece 232 fastened to the second base 2312 and the first base 2311. The first base 2311 is connected to the movable part 21, so that the movable base 231 is directly connected to the movable part 21.

In this embodiment of this application, the movable base 231 includes the first base 2311 and the second base 2312 fastened to the side that is of the first base 2311 and that is away from the lens assembly 10. The elastic connecting piece 232 is fastened to the second base 2312, and forms the gap with the first base 2311. The gap provides avoidance space when the lens assembly 10 rotates relative to the fastening part 22, to prevent the elastic connecting piece 232 from interfering with rotation of the lens assembly 10, thereby facilitating large-angle image stabilization of the camera module 102.

In an embodiment, the first base 2311 is fixedly connected to the inner frame 211, so that the movable base 231 is connected to the movable part 21. In this embodiment, the first base 2311 is assembled to the inner frame 211 enclosed around the lens assembly 10, thereby enhancing strength of a structure of the inner frame 211, preventing the inner frame 211 from being easily deformed due to an external force, and improving reliability of the camera module 102.

In this embodiment, a projection of a joint between the elastic connecting piece 232 and the second base 2312 on the rigid board part 111 is located in a middle area of the rigid board part 111, and correspondingly, a projection of the second base 2312 on the rigid board part 111 is located in the middle area of the rigid board part 111, so that the elastic connecting piece 232 and the first base 2311 are spaced.

In another embodiment of this application, the projection of the joint between the elastic connecting piece 232 and the second base 2312 on the rigid board part 111 may also be located in another area of the rigid board part 111, for example, four corners of the rigid board part 111. In this case, a shape of the second base 2312 changes correspondingly. It may be understood that the shape of the second base 2312 may change according to a change of a position at which the elastic connecting piece 232 is fastened to the movable base 231. In other words, a specific position at which the elastic connecting piece 232 is fastened to the movable base 231 is not limited in this application, and a specific form of the movable base 231 is not limited either.

In an embodiment, the first base 2311 is integrated with the reinforcement structure in the rigid board part 111, thereby further reducing the distance between the rotation center R of the movable part 21 and the rigid board part 111.

It may be understood that, if the first base 2311 meets structural rigidity and the second base 2312 provides sufficient avoidance space for rotation of the lens assembly 10, a smaller thickness of the first base 2311 and the second base 2312 along the Z-axis direction indicates a smaller spacing between the rotation center R of the movable part 21 and the rigid board part 111, so that a smaller reactive force generated by the flexible board part 112 in the image stabilization process of the camera module 102 is generated. Therefore, it is more conducive to improving image stabilization of the image stabilization assembly 20. When the elastic connecting piece 232 fastened to the side edge of the movable base 231, that is, the elastic connecting piece 232 is located around the movable base 231, in this case, the movable base 231 may not be provided with the second base 2312 to provide avoidance space.

In some embodiments, the first base 2311 and the second base 2312 may be integrally formed. In another embodiment, the first base 2311 and the second base 2312 can also be fixedly connected in a snap-fit manner. This is not limited in this application.

Figure 5:
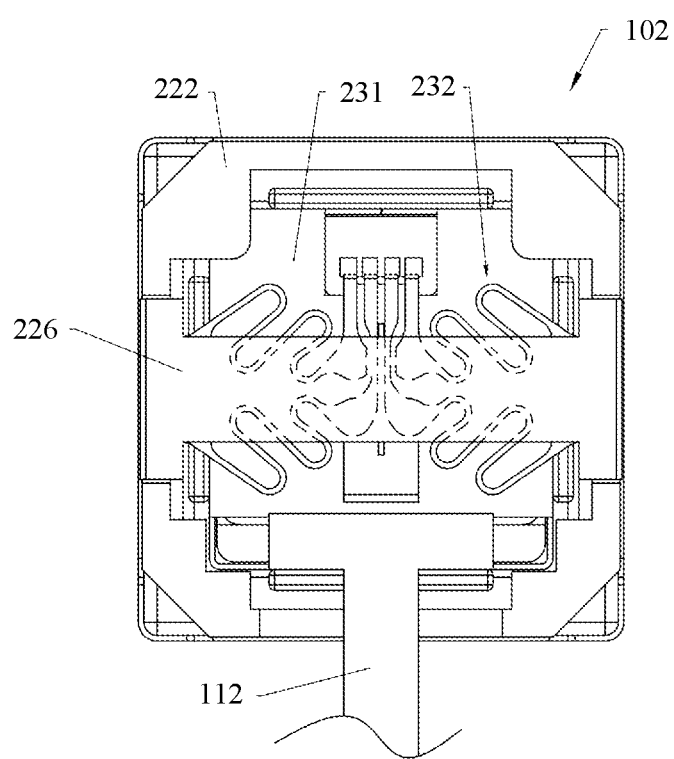
FIG. 5 is a bottom view of the camera module shown in FIG. 2 in some embodiments.

Still refer to FIG. 4 and FIG. 5. FIG. 5 is a bottom view of the camera module 102 shown in FIG. 2 in some embodiments. In an embodiment, the fastening part 22 further includes a fastening baffle 226. The fastening baffle 226 is located on a side that is of the elastic connecting piece 232 and that is away from the movable base 231. The fastening baffle 226 is fastened to the bracket 222, and a projection of the fastening baffle 226 on the movable base 231 covers at least a part of a projection of the elastic connecting piece 232 on the movable base 231.

In this embodiment, the fastening baffle 226 is located on the side that is of the elastic connecting piece 232 and that is away from the movable base 231, and the projection of the fastening baffle 226 on the base covers at least the part of the projection of the elastic connecting piece 232 on the movable base 231, to protect the elastic connecting piece 232 and prevent the elastic connecting piece 232 from being deformed by an external force, thereby improving quality of the camera module 102. For example, when the camera module 102 is assembled to the electronic device 100, the fastening baffle 226 can protect the elastic connecting piece 232, to avoid damage to the elastic connecting piece 232 in an assembly process.

As shown in FIG. 4, in an embodiment, a gap is formed between the fastening baffle 226 and the elastic connecting piece 232.

In this embodiment of this application, the gap is formed between the fastening baffle 226 and the elastic connecting piece 232. The gap provides avoidance space when the movable part 21 rotates relative to the fastening part 22 to drive the movable base 231 to rotate relative to the fastening part 22, to prevent the fastening baffle 226 from interfering with the movable part 21 or the movable base 231, thereby improving reliability of the camera module 102.

Figure 6:
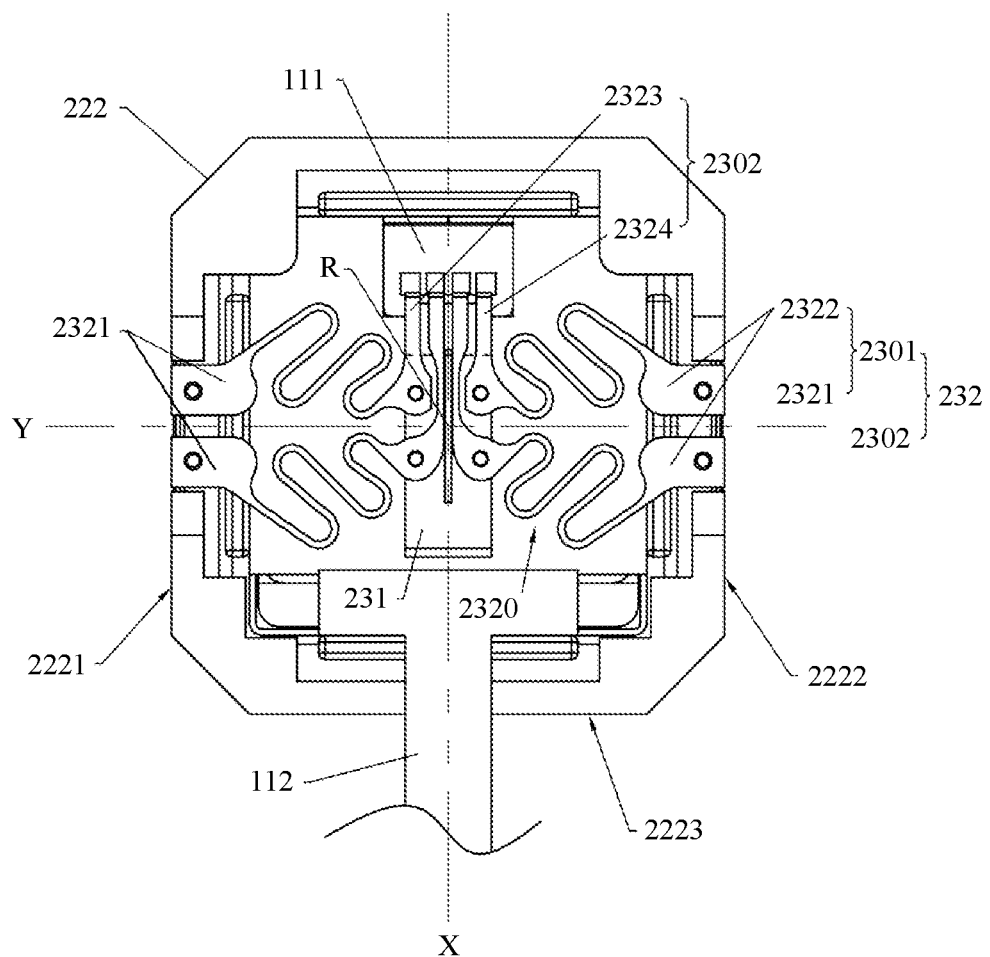
FIG. 6 is a schematic diagram of a part of structure of the camera module shown in FIG. 5.

FIG. 6 is a schematic diagram of a part of structure of the camera module 102 shown in FIG. 5. The elastic connecting piece 232 includes a spring plate group 2301. One end of the spring plate group 2301 is fastened to the movable base 231, and the other end is fastened to the fastening part 22. For example, the spring plate group 2301 includes a first spring plate group 2321 and a second spring plate group 2322 that are spaced. The first spring plate group 2321 and the second spring plate group 2322 are symmetrically arranged in an X-axis direction. The X-axis direction is perpendicular to the Z-axis direction.

In this embodiment, the elastic connecting piece 232 includes the first spring plate group 2321 and the second spring plate group 2322 that are symmetrically arranged along the X-axis direction, so that the image stabilization assembly 20 drives the lens assembly 10 to tilt leftward and rightward in a balanced and stable manner relative to the fastening part 22 along the X-axis direction, to effectively compensate for an offset of the lens assembly 10 in the X-axis direction.

The first spring plate group 2321 includes spring plates 2320 symmetrically arranged in a Y-axis direction. The Y-axis direction is perpendicular to the Z-axis direction. The Y-axis direction is perpendicular to and intersects the X-axis direction. It may be understood that the elastic connecting piece 232 includes a plurality of spring plates 2320, and two ends of each spring plate 2320 are respectively connected to the movable base 231 and the fastening part 22. The plurality of spring plates 2320 are spaced, to avoid that the plurality of spring plates 2320 interfere with each other and affect image stabilization of the camera module 102. The plurality of spring plates 2320 are symmetrically arranged in the X-axis direction, and symmetrically arranged in the Y-axis direction.

As shown in FIG. 6, for example, there are four spring plates 2320. Both the first spring plate group 2321 and the second spring plate group 2322 include two spring plates 2320 symmetrically arranged perpendicular to the X-axis direction, and the two spring plates 2320 are respectively connected to the fastening part 22 and the movable part 21. In another embodiment, there may be another quantity of spring plates 2320, and the quantity of spring plates 2320 is not limited in this application.

In this embodiment, the elastic connecting piece 232 includes the plurality of spring plates 2320 symmetrically arranged in the X-axis direction and symmetrically arranged in the Y-axis direction, so that the image stabilization assembly 20 drives the lens assembly 10 to tiltedly rotate in a balanced and stable manner relative to the fastening part 22 in the X-axis direction and the Y-axis direction, to effectively compensate for offsets of the camera module 102 in the X-axis direction and the Y-axis direction.

An intersection point of a Y axis and an X axis is the rotation center R of the movable part 21. The rotation center R of the movable part 21 is located in the Z-axis direction, and is located in a middle area of the movable base 231.

It may be understood that, based on that the plurality of spring plates 2320 are symmetrically arranged along the X-axis direction and symmetrically arranged along the Y-axis direction, a symmetric center of the plurality of spring plates 2320 is the intersection point between the Y axis and the X axis. In this embodiment, the symmetric center of the plurality of spring plates 2320 is the rotation center R of the movable part 21, and the rotation center R is located in the middle area of the movable base 231, so that a driving force arm that cooperates with the second driving piece 220 and the first driving piece 210 to drive the lens assembly 10 to rotate is maximized, and therefore the camera module 102 can rotate at a large angle, to improve image stabilization performance.

In an embodiment, the spring plate 2320 includes a first end part, a deformation part, and a second end part. The first end part is fastened to the bracket 222. The second end part is fastened to the movable base 231. The deformation part is connected between the first end part and the second end part, and the deformation part is curved.

In this embodiment, the spring plate 2320 is provided with the bent deformation part, so that the spring plate 2320 can deform in different directions, thereby facilitating implementation of large-angle image stabilization of the camera module 102. A curved shape of the spring plate 2320 in FIG. 6 is merely an example. In another embodiment, the spring plate 2320 may also be in another shape. This is not limited in this application.

As shown in FIG. 6, in an embodiment, the flexible board part 112 extends from the rigid board part 111 along the X-axis direction or the Y-axis direction to the outer side of the image stabilization assembly 20. As shown in FIG. 6, for example, the flexible board part 112 extends in the X direction. In another embodiment, the flexible board part 112 can also extend in the Y direction. This is not limited in this application.

In this embodiment of this application, an extension direction of the flexible board part 112 is the same as a rotation axis (the X-axis direction or the Y-axis direction) of rotation of the lens assembly 10 relative to the fastening part 22, and the flexible board part 112 may be folded and bent, so that when the lens assembly 10 rotates, a displacement of the flexible board part 112 relative to the fastening part 22 is small, and the reactive force generated by the flexible board part 112 is small, thereby facilitating image stabilization of the camera module 102.

Figure 7:
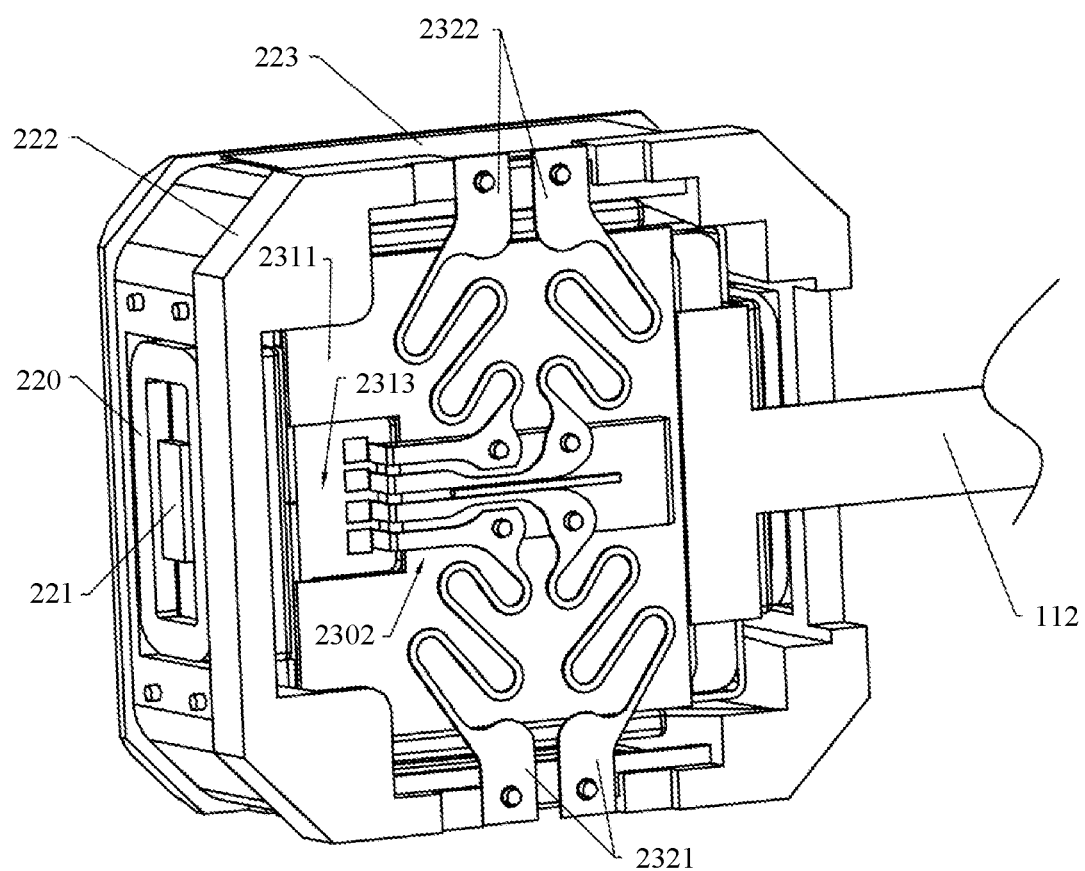
FIG. 7 is a schematic diagram of a structure of the camera module shown in FIG. 6 from another angle.

Refer to FIG. 6 and FIG. 7. FIG. 7 is a schematic diagram of a structure of the camera module 102 shown in FIG. 6 from another angle. In an embodiment, the elastic connecting piece 232 is made of a conductive material. The elastic connecting piece 232 is electrically connected to the rigid board part 111 and the fastening part 22. For example, one end of the elastic connecting piece 232 is electrically connected to the rigid board part 111, and the other end is electrically connected to the connecting plate 223, to implement the electrical connection between the connecting plate 223 and the rigid board part 111. Electrical signals of the image stabilization assembly 20 are concentrated in the second driving piece 220 (the coil 202) and the position detector 221, and electrical signals of the second driving piece 220 and the position detector 221 are integrated into the connecting plate 223, so that the electrical signals of the image stabilization assembly 20 can be transmitted to an outer side of the camera module 102 by using the connecting plate 223.

In a conventional technology, a connector is used to transfer the electrical signals of the connecting plate 223 to the outer side of the camera module 102. However, in this embodiment, the elastic connecting piece 232 implements the electrical connection between the connecting plate 223 and the rigid board part 111, so that the electrical signals of the connecting plate 223 are directly integrated into the rigid board part 111 of the lens assembly 10, so that the electrical signal of the connecting plate 223 can be finally transmitted to the outer side of the camera module 102 by using the rigid board part 111.

In this embodiment, the elastic connecting piece 232 not only connects the movable part 21 and the fastening part 22, but also implements the electrical connection between the image stabilization assembly 20 and the lens assembly 10, so that electrical signals of the image stabilization assembly 20 can be integrated into the lens assembly 10 by using the elastic connecting piece 232, thereby avoiding a case in which the electrical signals of the image stabilization assembly 20 are led out to the outer side of the camera module 102 by separately disposing a connector, reducing a quantity of connectors in the camera module 102, and reducing space occupied by the camera module 102.

As shown in FIG. 6 and FIG. 7, in an embodiment, the elastic connecting piece 232 further includes an extension piece 2302. The extension piece 2302 extends from one end of the spring plate 2320 fastened to the movable base 231 to the rigid board part 111, and is electrically connected to the rigid board part 111. For example, the extension piece 2302 includes a first extension piece 2323 and a second extension piece 2324 that are spaced. The first extension piece 2323 extends from the first spring plate group 2321 to the rigid board part 111. The second extension piece 2324 extends from the second spring plate group 2322 to the rigid board part 111. The first extension piece 2323 and the second extension piece 2324 are respectively fastened to the movable base 231.

It may be understood that a joint between the first extension piece 2323 and the first spring plate group 2321 and a joint between the second extension piece 2324 and the second spring plate group 2322 each are a position at which the elastic connecting piece 232 is fastened to the movable base 231. Because two ends of the first extension piece 2323 and two ends of the second extension piece 2324 are respectively fastened to the movable base 231 and the rigid board part 111, so that the two ends of the first extension piece 2323 and the two ends of the second extension piece 2324 (the extension piece 2302) each are fixedly connected relative to the movable part 21.

In this embodiment, the spring plate 2320 supports the movable part 21 and the lens assembly 10, and the movable part 21 rotates relative to the fastening part 22 in an image stabilization process of the camera module 102, and the spring plate 2320 is deformed. However, because both ends of the extension piece 2302 are fixedly connected to the movable part 21, the extension piece 2302 does not deform in the image stabilization process of the camera module 102, thereby ensuring stability of the electrical connection between the elastic connecting piece 232 and the rigid board part 111, and improving reliability of the camera module 102.

In an embodiment, the extension piece 2302 and the spring plate 2320 are integrally formed. For example, the first extension piece 2323 and the first spring plate group 2321 are integrally formed, and the second extension piece 2324 and the second spring plate group 2322 are integrally formed. In this embodiment, the extension piece 2302 (the first extension piece 2323 and the second extension piece 2324) and the spring plate 2320 (the first spring plate group 2321 and the second spring plate group 2322) are integrally formed, to simplify design of the elastic connecting piece 232. In another embodiment, the extension piece 2302 and the spring plate 2320 may also be different components. This is not limited in this application.

As shown in FIG. 6 and FIG. 7, in an embodiment, the first base 2311 is provided with accommodating space 2313 that penetrates the first base 2311. The extension piece 2302 passes through the accommodating space 2313 and is electrically connected to the rigid board part 111. It may be understood that an interface electrically connected to the first extension piece 2323 and the second extension piece 2324 is disposed on the rigid board part 111. The first extension piece 2323 and the second extension piece 2324 are electrically connected to the rigid board part 111 through the interface.

In this embodiment, the extension part 2302 passes through the accommodating space 2313 to connect the rigid board part 111, so that interfaces for the electrical connection between the rigid board part 111 and the elastic connecting piece 232 are centralized in a same area of the rigid board part 111, thereby avoiding scattered distribution of the interfaces for the electrical connection between the rigid board part 111 and the elastic connecting piece 232, and simplifying design of the rigid board part 111.

Figure 8:
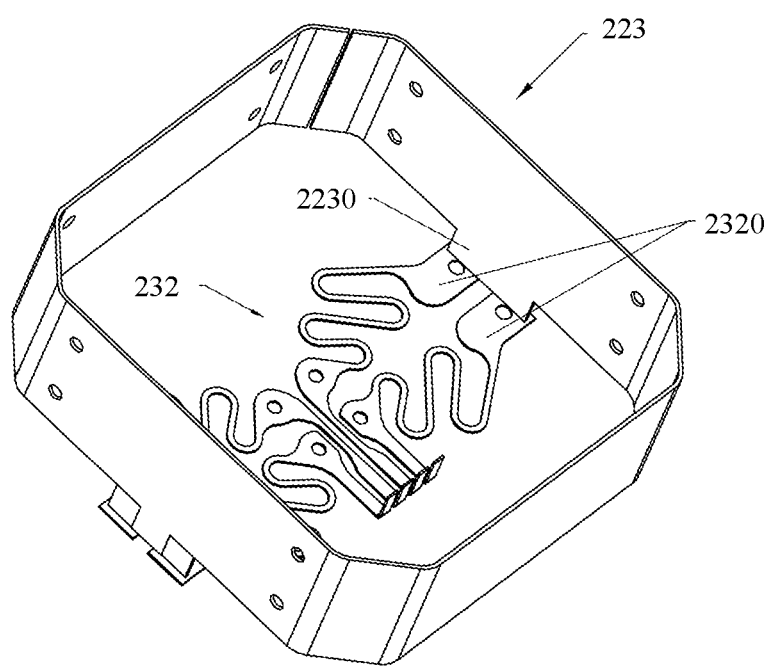
FIG. 8 is a schematic diagram of another part of structure of the camera module shown in FIG. 5.

Refer to FIG. 6 and FIG. 8. FIG. 8 is a schematic diagram of another part of structure of the camera module 102 shown in FIG. 5. The bracket 222 includes a first side wall 2221 and a second side wall 2222 that are disposed opposite to each other. One end of one part of the elastic connecting piece 232 is fastened at a middle area of the first side wall 2221, and the other end is fastened to the movable base 231; and one end of the other part of the elastic connecting piece 232 is fastened at a middle area of the second side wall 2222, and the other end is fastened to the movable base 231.

The connecting plate 223 includes two lead-out ends 2230 disposed opposite to each other. The lead-out end 2230 is configured to contact with each spring plate 2320, to implement the electrical connection between the connecting plate 223 and the elastic connecting piece 232. One lead-out end 2230 is connected to the elastic connecting piece 232 fastened on the first side wall 2221, and the other lead-out end 2230 is connected to the elastic connecting piece 232 fastened on the second side wall 2222. For example, one lead-out end 2230 is connected and fastened to the first spring plate group 2321, and one end of the first spring plate group 2321 is fastened at the middle area of the first side wall 2221. The other lead-out end 2230 is connected to the second spring plate group 2322, and one end of the second spring plate group 2322 is fastened at the middle area of the second side wall 2222.

In this embodiment, the first spring plate group 2321 and the second spring plate group 2322 are respectively fastened at intermediate positions of the first side wall 2221 and the second side wall 2222 that are disposed opposite to the bracket 222, thereby reducing a distance between the symmetrically arranged spring plates 2320 in the spring plate group 2301 (the first spring plate group 2321 and the second spring plate group 2322), so that the lead-out ends 2230 of the connecting plate 223 electrically connected to each spring plate 2320 are centralized, thereby reducing outlets of the lead-out ends 2230 in the connecting plate 223, and facilitating the electrical connection between the elastic connecting piece 232 and the connecting plate 223.

Figure 9:
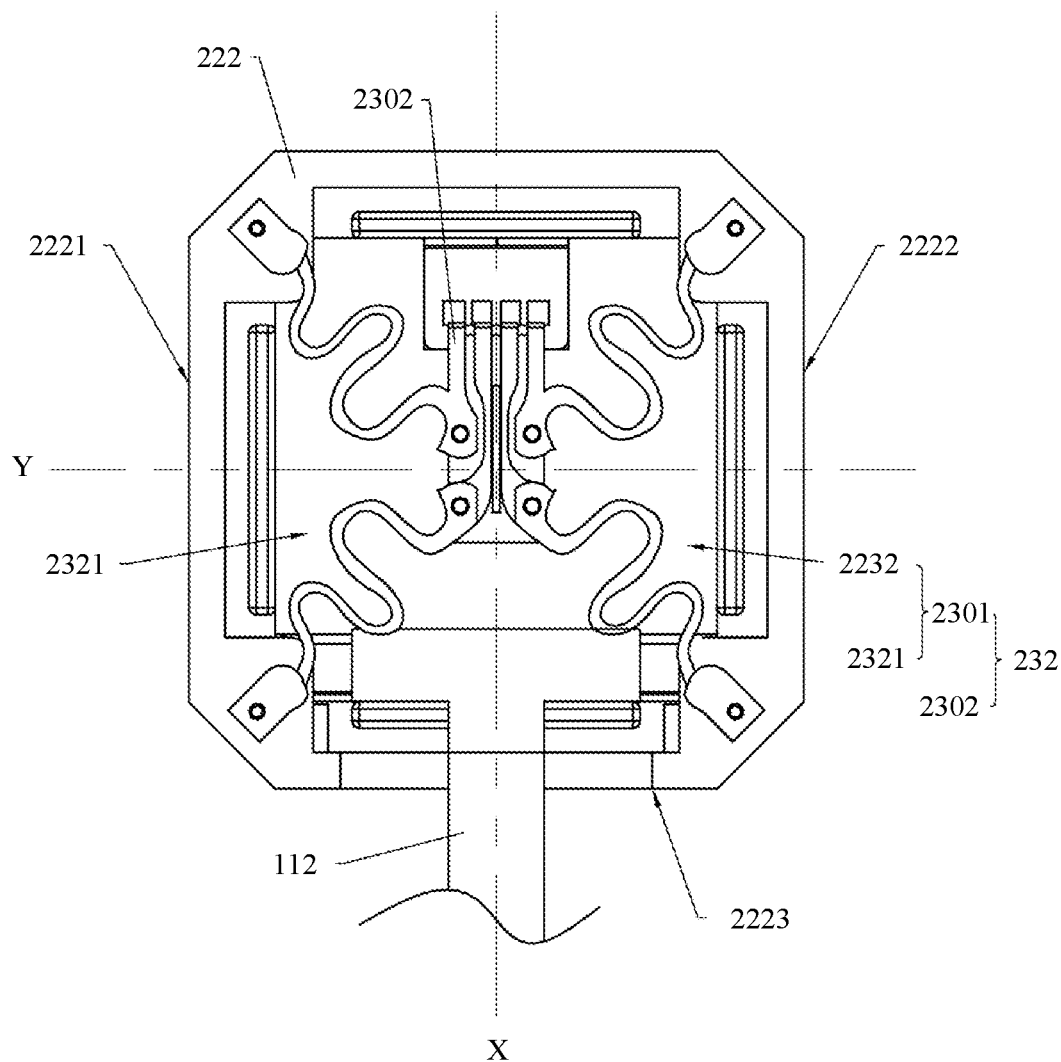
FIG. 9 is a bottom view of the camera module shown in FIG. 2 in some other embodiments.

Still refer to FIG. 9. FIG. 9 is a bottom view of the camera module shown in FIG. 2. In some other embodiments. In some embodiments, one end of the first spring plate group 2321 can also be fastened to two ends that are disposed opposite to the first side wall 2221, and one end of the second spring plate group 2322 is fastened to two ends that are disposed opposite to the second side wall 2222. That is, the elastic connecting piece 232 can also be fastened at four corners of the bracket 222. It may be understood that a specific position at which the elastic connecting piece 232 is installed on the bracket 222 is not limited in this application.

Figure 10:
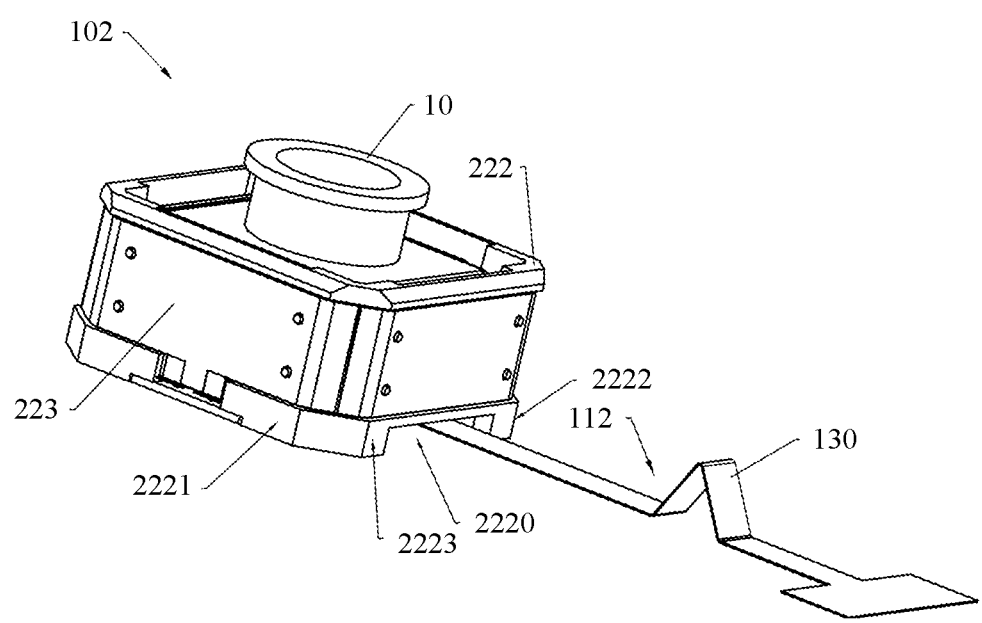
FIG. 10 is a schematic diagram of a part of structure of the camera module shown in FIG. 2.

Still refer to FIG. 10. FIG. 10 is a schematic diagram of a part of structure of the camera module 102 shown in FIG. 2. In an embodiment, the bracket 222 further includes a third side wall 2223 connected between the first side wall 2221 and the second side wall 2222. The third side wall 2223 is provided with avoidance space 2220. The flexible board part 112 in the lens assembly 10 extends through the avoidance space 2220 to the outer side of the bracket 222.

In this embodiment, the avoidance space 2220 not only provides lead-out space of the flexible board part 112 led out to the outer side of the camera module 102, but also provides deformation space of the flexible board part 112, to avoid interference between the flexible board part 112 and the bracket 222 in an image stabilization process of the camera module 102, thereby affecting rotation of the lens assembly 10.

In some embodiments, the flexible board part 112 is provided with a bending part 130 along an extension direction of the flexible board part 112. The bending part 130 can change a length of the flexible board part 112 in the extension direction of the flexible board part 112. In some embodiments, the bending part 130 is arched along a direction of an optical axis.

In this embodiment, the flexible board part 112 is provided with the bending part 130 along the extension direction of the flexible board part 112, so that when the lens assembly 10 pulls the flexible board part 112 in a process of rotating relative to the fastening part 22, the length of the flexible board part 112 may change accordingly, to provide a buffer amount for deformation of the flexible board part 112, thereby further reducing a reactive force generated by the flexible board part 112.

Figure 11:
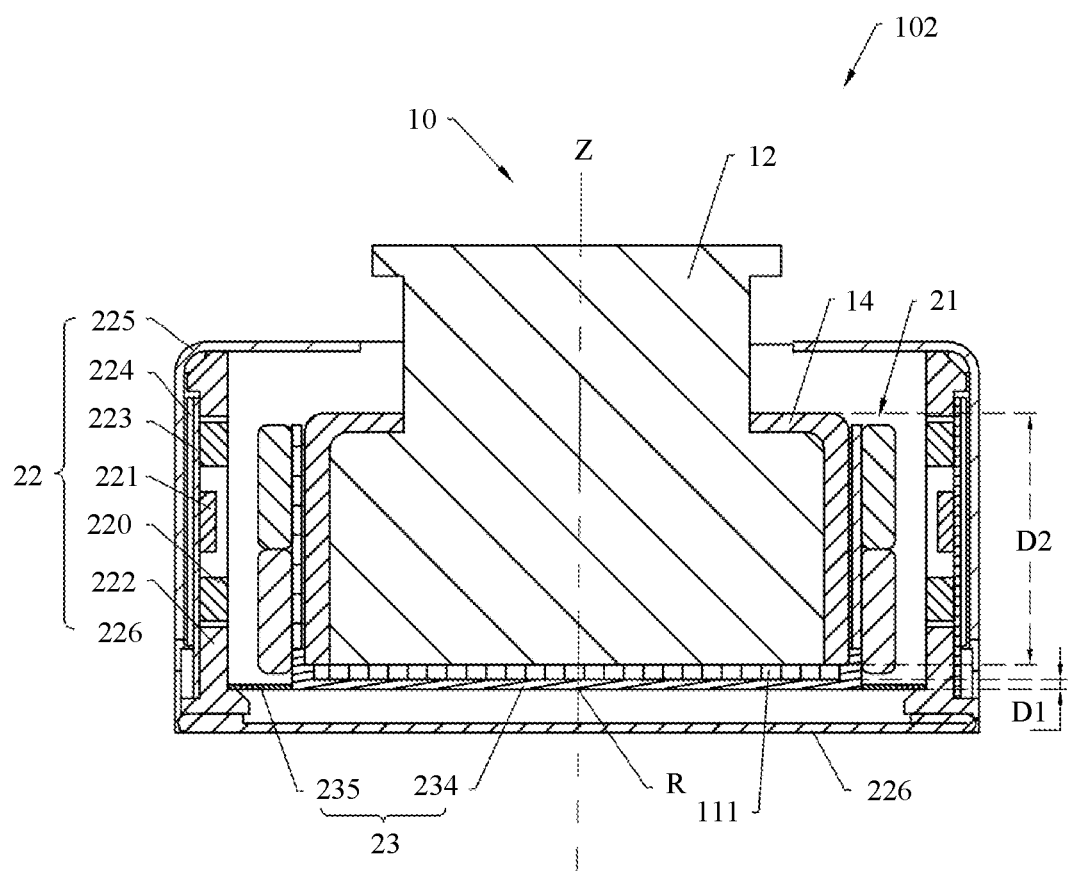
FIG. 11 is a schematic diagram of an internal structure of the camera module shown in FIG. 1 in some other embodiments.

Refer to FIG. 11. FIG. 11 is a schematic diagram of an internal structure of the camera module 102 shown in FIG. 1 in some other embodiments. This embodiment includes most technical features of the foregoing embodiments, and content of most technical solutions that are the same as those in the foregoing embodiments in the following embodiments is not described again. For example, the camera module 102 includes a lens assembly 10 and an image stabilization assembly 20. The lens assembly 10 is located on an inner side of the image stabilization assembly 20. The lens assembly 10 includes a rigid board part 111 and a lens 12. The image stabilization assembly 20 includes a movable part 21, a fastening part 22, and a connecting component 23 that connects the movable part 21 and the fastening part 22. The movable part 21 is configured to rotate relative to the fastening part 22 by using the connecting component 23, and a coordinate of a rotation center R of the movable part 21 in a Z-axis direction is close to or equal to a coordinate of the rigid board part 111 in the Z-axis direction.

In some embodiments, the connecting component 23 includes a rigid connecting piece 234 and a flexible connecting piece 235. The rigid connecting piece 234 is fastened around the lens assembly 10, and at least a part of the rigid connecting piece 234 is enclosed around the rigid board part 111. For example, the rigid connecting piece 234 surrounds a bottom surface and a side surface of the rigid board part 111, so that the rigid connecting piece 234 is securely connected to the lens assembly 10, to improve reliability of the camera module 102. An extension direction of the flexible connecting piece 235 is perpendicular to an optical axis direction of the lens 12.

As shown in FIG. 11, in some embodiments, one end of the flexible connecting piece 235 is fastened to a side edge that is of the rigid connecting piece 234 and that is close to the rigid board part 111, and the other end is fastened to the fastening part 22. In another embodiment, the rigid connecting piece 234 may also be fastened on the side surface of the rigid board part 111. This is not limited in this application.

In this embodiment, the at least the part of the rigid connecting piece 234 is enclosed around the rigid board part 111, and the flexible connecting piece 235 is fastened to the side that is of the rigid connecting piece 234 and that is close to the rigid board part 111, so that the flexible connecting piece 235 is close to the rigid board part 111 in the Z-axis direction, thereby reducing the spacing between the rotation center R of the movable part 21 and the rigid board part 111. If the rotation angle of the lens assembly 10 meets the requirement, the reactive force generated by the flexible board part 112 is small, thereby facilitating image stabilization of the image stabilization assembly 20.

In this embodiment, the flexible connecting piece 235 is fastened to the side edge of the rigid connecting piece 234, thereby avoiding that when the flexible connecting piece 235 is fastened to a side that is of the rigid connecting piece 234 and that is away from the rigid board part 111, a spacing between the flexible connecting piece 235 and the rigid board part 111 is increased due to a thickness of the rigid connecting piece 234, so that the coordinate of the rotation center R of the movable part 21 in the Z-axis direction may be equal to the coordinate of the rigid board part 111 in the Z-axis direction.

It may be understood that, based on that the flexible connecting piece 235 is fastened to the side edge of the rigid connecting piece 234, no avoidance space needs to be disposed at the bottom of the rigid connecting piece 234, to avoid interference between the flexible connecting piece 235 and the rigid connecting piece 234. That is, no protrusion may be disposed on the side that is of the rigid connecting piece 234 and that is away from the rigid board part 111.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A camera module, comprising:
a lens assembly and
an image stabilization assembly,
wherein the lens assembly comprises a rigid flexible printed circuit board and a lens, and the rigid flexible printed circuit board comprises a rigid board part and a flexible board part led out from the rigid board part; and
wherein the image stabilization assembly comprises a movable part, a fastening part, and a connecting component; the movable part is fastened to the lens assembly, the fastening part is connected to the movable part by using the connecting component, and the movable part is configured to rotate relative to the fastening part by using the connecting component; and a coordinate of a rotation center of the movable part in a Z-axis direction is close to or equal to a coordinate of the rigid board part in the Z-axis direction, and the Z-axis direction is a direction of an optical axis of the lens.

2. The camera module according to claim 1, wherein a distance between the rotation center of the movable part and the rigid board part in the Z-axis direction is a first distance, and the first distance is less than half of a shoulder height of the lens.

3. The camera module according to claim 1, wherein the connecting component comprises a movable base and an elastic connecting piece,
wherein the movable base is fastened to a side that is of the rigid board part and that is away from the lens, one end of the elastic connecting piece is connected to the movable base, and an other end is connected to the fastening part.

4. The camera module according to claim 3, wherein the elastic connecting piece comprises a plurality of spring plates, two ends of each spring plate are respectively connected to the movable base and the fastening part, and the plurality of spring plates are symmetrically arranged in an X-axis direction and symmetrically arranged in a Y-axis direction; and both the X-axis direction and the Y-axis direction are perpendicular to the Z-axis direction, the X-axis direction and the Y-axis direction are perpendicular and intersect, and an intersection point of an X axis and a Y axis is the rotation center of the movable part.

5. The camera module according to claim 4, wherein the flexible board part extends from the rigid board part along the X-axis direction or the Y-axis direction to an outer side of the image stabilization assembly.

6. The camera module according to claim 3, wherein the movable base comprises a first base and a second base, and the second base is fastened to a side that is of the first base and that is away from the lens assembly; and one end of the elastic connecting piece is fastened to the second base, and a gap is formed between the elastic connecting piece and the first base.

7. The camera module according to claim 3, wherein the fastening part further comprises a fastening baffle, the fastening baffle is located on a side that is of the elastic connecting piece and that is away from the movable base,
wherein a gap is formed between the fastening baffle and the elastic connecting piece, and
wherein a projection of the fastening baffle on the movable base covers at least a part of a projection of the elastic connecting piece on the movable base.

8. The camera module according to claim 3, wherein the elastic connecting piece is made of a conductive material, and the elastic connecting piece is electrically connected to the rigid board part and the fastening part.

9. The camera module according to claim 3, wherein the movable part further comprises an inner frame and a first driving piece, the inner frame is located around the lens assembly, and the first driving piece is fastened around the inner frame; and
the fastening part comprises a bracket and a second driving piece, the bracket is located on an outer side of the movable part, and the second driving piece is fastened relative to the bracket and disposed opposite to the first driving piece; and based on image stabilization assembly responding to an electrical signal, magnetic field effect is formed between the second driving piece and the first driving piece, to drive the lens assembly to rotate relative to the fastening part.

10. The camera module according to claim 9, wherein the first driving piece comprises a magnetic body, and the second driving piece comprises a coil; and the fastening part further comprises a connecting plate, the connecting plate is fastened to the bracket, and the connecting plate is electrically connected to the coil.

11. The camera module according to claim 10, wherein the bracket comprises a first side wall and a second side wall that are disposed opposite to each other, one end of one part of the elastic connecting piece is fastened at a middle area of the first side wall, and an other end is fastened to the movable base; and one end of an other part of the elastic connecting piece is fastened at a middle area of the second side wall, and an other end is fastened to the movable base; and the connecting plate comprises two lead-out ends disposed opposite to each other, wherein one lead-out end is connected to the elastic connecting piece fastened on the first side wall, and an other lead-out end is connected to the elastic connecting piece fastened on the second side wall.

12. The camera module according to claim 11, wherein the bracket further comprises a third side wall connected between the first side wall and the second side wall, the third side wall is provided with avoidance space, and the flexible board part extends through the avoidance space to the outer side of the image stabilization assembly.

13. The camera module according to claim 9, wherein the image stabilization assembly further comprises a position detector, and the position detector is configured to detect a position of the movable part relative to the fastening part.

14. The camera module according to claim 9, wherein the elastic connecting piece comprises a spring plate and an extension piece, one end of the spring plate is fastened to the movable base, and the other end is fastened to the fastening part; and the extension piece extends from the end of the spring plate fastened to the movable base to the rigid board part, and is electrically connected to the rigid board part.

15. The camera module according to claim 1, wherein the fastening part further comprises an outer cover, the outer cover is enclosed around the movable part, the outer cover has a limiting part, and the limiting part protrudes in a direction close to the lens assembly and is spaced from the lens assembly.

16. The camera module according to claim 1, wherein the connecting component comprises a rigid connecting piece and a flexible connecting piece, wherein the rigid connecting piece is fastened around the lens assembly, and at least a part of the rigid connecting piece is enclosed around the rigid board part; and one end of the flexible connecting piece is fastened to a side edge that is of the rigid connecting piece and that is close to the rigid board part, and an other end is fastened to the fastening part.

17. An electronic device, comprising:

a housing and a camera module, wherein the camera module is installed on the housing;

wherein the camera module comprises a lens assembly and an image stabilization assembly, wherein the lens assembly comprises a rigid flexible printed circuit board and a lens, and the rigid flexible printed circuit board comprises a rigid board part and a flexible board part led out from the rigid board part; and wherein the image stabilization assembly comprises a movable part, a fastening part, and a connecting component; the movable part is fastened to the lens assembly, the fastening part is connected to the movable part by using the connecting component, and the movable part is configured to rotate relative to the fastening part by using the connecting component; and a coordinate of a rotation center of the movable part in a Z-axis direction is close to or equal to a coordinate of the rigid board part in the Z-axis direction, and the Z-axis direction is a direction of an optical axis of the lens.

18. The electronic device according to claim 17, wherein a distance between the rotation center of the movable part and the rigid board part in the Z-axis direction is a first distance, and the first distance is less than half of a shoulder height of the lens.

19. The electronic device according to claim 17, wherein the connecting component comprises a movable base and an elastic connecting piece, wherein the movable base is fastened to a side that is of the rigid board part and that is away from the lens, one end of the elastic connecting piece is connected to the movable base, and an other end is connected to the fastening part.

20. The electronic device according to claim 19, wherein the elastic connecting piece comprises a plurality of spring plates, two ends of each spring plate are respectively connected to the movable base and the fastening part, and the plurality of spring plates are symmetrically arranged in an X-axis direction and symmetrically arranged in a Y-axis direction; and both the X-axis direction and the Y-axis direction are perpendicular to the Z-axis direction, the X-axis direction and the Y-axis direction are perpendicular and intersect, and an intersection point of an X axis and a Y axis is the rotation center of the movable part.

* * * * *